United States Patent
Kobayashi et al.

(10) Patent No.: US 10,380,453 B2
(45) Date of Patent: Aug. 13, 2019

(54) IMAGING APPARATUS AND IMAGING SYSTEM HAVING MULTIPLE COMPARATORS

(71) Applicant: CANON KABUSHIKI KAISHA, Tokyo (JP)

(72) Inventors: Hideo Kobayashi, Tokyo (JP); Kei Ochiai, Inagi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 202 days.

(21) Appl. No.: 15/632,198

(22) Filed: Jun. 23, 2017

(65) Prior Publication Data

US 2017/0372168 A1 Dec. 28, 2017

(30) Foreign Application Priority Data

Jun. 28, 2016 (JP) ................................ 2016-128199

(51) Int. Cl.
*G06K 9/62* (2006.01)
*G06T 1/20* (2006.01)
(Continued)

(52) U.S. Cl.
CPC .............. *G06K 9/6202* (2013.01); *G06T 1/20* (2013.01); *G06T 7/136* (2017.01); *G09G 3/2092* (2013.01); *H04N 5/378* (2013.01); *H04N 9/07* (2013.01); *G09G 3/2048* (2013.01); *G09G 2310/027* (2013.01); *G09G 2310/0275* (2013.01); *G09G 2320/0295* (2013.01); *G09G 2320/045* (2013.01); *G09G 2320/0693* (2013.01)

(58) Field of Classification Search
CPC ........ G06K 9/6202; H04N 9/07; H04N 5/378; G09G 3/2092; G09G 2320/0693; G09G 2320/045; G09G 2320/0295; G09G 2310/0275; G09G 2310/027; G09G 3/2048; G06T 1/20; G06T 7/136
See application file for complete search history.

(56) References Cited

U.S. PATENT DOCUMENTS 7,221,343 B2* 5/2007 Kageyama ........... G09G 3/3233
 345/82
9,300,889 B2* 3/2016 Hashimoto ............ H04N 5/353
(Continued)

FOREIGN PATENT DOCUMENTS

| JP | 2009-200546 A | 9/2009 |
|---|---|---|
| JP | 2014-96670 A | 5/2014 |
| JP | 2014-165579 A | 9/2014 |

*Primary Examiner* — Wesley J Tucker
(74) *Attorney, Agent, or Firm* — Canon U.S.A., Inc. IP Division

(57) ABSTRACT

An imaging apparatus includes a first reset signal line which is commonly connected to multiple first comparator circuits and through which a first reset signal to reset a threshold value of each of the multiple first comparator circuits is transmitted, a second reset signal line which is commonly connected to multiple second comparator circuits and through which a second reset signal to reset a threshold value of each of the multiple second comparator circuits is transmitted, and a shield line. The distance between the first reset signal line and the shield line and the distance between the second reset signal line and the shield line are smaller than the distance between the first reset signal line and the second reset signal line.

25 Claims, 11 Drawing Sheets

(51) Int. Cl.
*G09G 3/20* (2006.01)
*H04N 9/07* (2006.01)
*G06T 7/136* (2017.01)
*H04N 5/378* (2011.01)

(56) References Cited

U.S. PATENT DOCUMENTS

| | | |
|---|---|---|
| 9,544,519 B2 * | 1/2017 | Matsumoto ............ H04N 5/357 |
| 2007/0008206 A1 * | 1/2007 | Tooyama ............ H03M 1/0607 |
| | | 341/155 |
| 2010/0002094 A1 * | 1/2010 | Solhusvik ............ H04N 5/2355 |
| | | 348/230.1 |
| 2013/0271633 A1 * | 10/2013 | Hashimoto ............ H04N 5/353 |
| | | 348/300 |
| 2014/0085003 A1 | 3/2014 | Quinn |
| 2015/0171879 A1 | 6/2015 | Kimura |
| 2019/0007638 A1 * | 1/2019 | Ishibashi ................ H04N 5/378 |

* cited by examiner

IMAGING APPARATUS AND IMAGING SYSTEM HAVING MULTIPLE COMPARATORS

BACKGROUND OF THE INVENTION

Field of the Invention

One aspect of the embodiments relates to a comparator circuit in an imaging apparatus.

Description of the Related Art

In imaging apparatuses in which analog-to-digital (AD) conversion is performed, a comparator circuit provided for each pixel column compares a pixel signal with a reference signal and outputs a comparison signal. Storing a digital value in a counter in a memory at timing when the comparison signal is output enables the AD conversion.

Japanese Patent Laid-Open No. 2014-96670 discloses a comparator that performs auto-zeroing in accordance with any of multiple auto-zero signals having different timings when the auto-zeroing is instructed.

With the technology disclosed in Japanese Patent Laid-Open No. 2014-96670, the wiring structure of the comparator is not sufficiently considered and the comparison of the input signals may not be accurately performed due to coupling between lines. Accordingly, it is desirable to improve the accuracy of comparison in a comparator circuit.

SUMMARY OF THE INVENTION

The aspect of the embodiments provides an imaging apparatus including multiple pixels and multiple comparator circuits each outputting a comparison signal. A pixel signal based on outputs from the pixels and a reference signal are input into each of the multiple comparator circuits. The level of the comparison signal when the difference between the pixel signal and the reference signal is smaller than a threshold value is different from the level of the comparison signal when the difference between the pixel signal and the reference signal is greater than the threshold value. Multiple first comparator circuits, among the multiple comparator circuits, and multiple second comparator circuits, among the multiple comparator circuits, are arranged in line. The imaging apparatus further includes a first reset signal line which is commonly connected to the multiple first comparator circuits and through which a first reset signal to reset a threshold value of each of the multiple first comparator circuits is transmitted, a second reset signal line which is commonly connected to the multiple second comparator circuits and through which a second reset signal to reset a threshold value of each of the multiple second comparator circuits is transmitted, and a shield line. The distance between the first reset signal line and the shield line and the distance between the second reset signal line and the shield line are smaller than the distance between the first reset signal line and the second reset signal line.

Further features of the disclosure will become apparent from the following description of exemplary embodiments with reference to the attached drawings.

DESCRIPTION OF THE EMBODIMENTS

Figure 1:
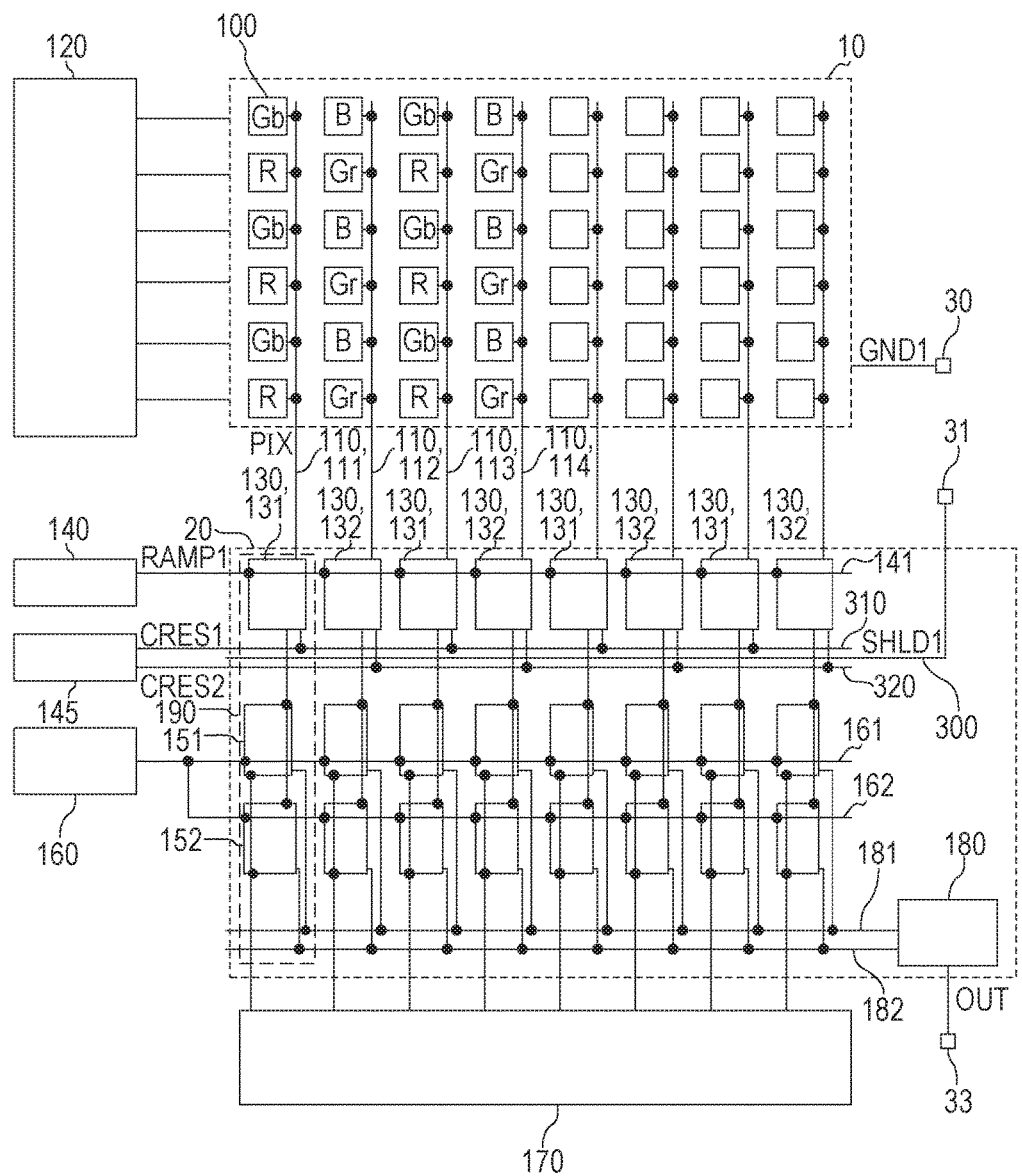
FIG. 1 is a schematic diagram describing a first exemplary configuration of an imaging apparatus.

Embodiments of the disclosure will herein be described with reference to the drawings. The same reference numerals are added to components common to multiple drawings in the following description and the drawings. Accordingly, the common components will be described with reference to the multiple drawings and a description of the components to which the same reference numerals are added will be appropriately omitted.

FIG. 1 is a block diagram illustrating an imaging apparatus IS. The imaging apparatus IS includes a pixel area 10 including multiple pixels 100. The pixels 100 are arranged in the pixel area 10 in a matrix.

A vertical scanning unit 120 controls the timing to read out each pixel row in the pixel area 10. Each of multiple AD converters 190 is provided so as to correspond to each pixel column in the pixel area 10. Each of the multiple AD converters 190 includes a comparator circuit 130. The respective multiple comparator circuits 130 are arranged in line so as to correspond to the pixel columns in the pixel area 10. An in-line arrangement is an arrangement in which the components are placed in a straight line, or aligned. A pixel signal PIX based on outputs from the pixels 100 in the pixel area 10 and a reference signal RAMP1 output from a reference signal generator 140 are input into the comparator circuit 130. The reference signal RAMP1 is transmitted through a reference signal line 141 commonly connected to the multiple comparator circuits 130. The comparator circuit 130 outputs a comparison signal COMP. The logic level of the comparison signal COMP when the difference in voltage between the pixel signal PIX and the reference signal RAMP1 is smaller than a threshold voltage Vth ($\geq 0$) is different from the logic level of the comparison signal COMP when the difference in voltage between the pixel signal PIX and the reference signal RAMP1 is greater than the voltage Vth ($\geq 0$). The reference signal RAMP1 is varied with time. Although a typical reference signal RAMP1 monotonously increases or decreases with time, the reference signal RAMP1 may be varied stepwise.

A counter 160 that counts n-bit digital values supplies the n-bit digital values to data lines 161 and 162. One counter 160 is commonly provided for the respective pixel columns in the pixel area 10. Each of the multiple AD converters 190 includes an n-bit digital memory 151 and an n-bit digital memory 152. The digital memories 151 and 152 acquire pieces of data on the data lines 161 and 162, respectively, based on the timing when the voltage level of the comparison signal COMP is inverted. The n-bit digital values are held in the digital memories 151 and 152. A case is exemplified in FIG. 1 in which n is equal to one. The digital memory 151 holds the digital value corresponding to an amount of noise of the pixels 100 and the digital memory 152 holds the digital value corresponding to an amount of signal of the pixels 100.

A horizontal scanning unit 170 controls the read-out timing by the digital memories 151 and 152 in each column and causes the digital values held in the digital memories 151 and 152 to be supplied to digital signal lines 181 and 182, respectively. The pieces of data held in the digital memories 151 and 152 are sequentially read out into the digital signal lines 181 and 182, respectively, at timing specified by the horizontal scanning unit 170. The difference between the digital values transmitted through the digital signal lines 181 and 182 are calculated in a signal processor 180 and a signal indicating the difference between the digital values is output through an output pad 33. Correlated double sampling (CDS) signal processing is performed in the above manner using the digital data in the signal processor 180. The generation of the signal indicating the difference between the digital values held in the digital memories 151 and 152 in the signal processor 180 enables removal of the amount of noise from the amount of signal to generate a signal having a high signal-to-noise (S/N) ratio.

A reset signal CRES1 or a reset signal CRES2 output from a reset signal generator 145 is input into each of the multiple comparator circuits 130, in addition to the reference signal RAMP1 and the pixel signal PIX. Among the multiple comparator circuits 130, each of the comparator circuits 130 into which the reset signal CRES1 is input is described as a comparator circuit 131 and each of the comparator circuits 130 into which the reset signal CRES2 is input is described as a comparator circuit 132.

Since the reset signal CRES1 is input into the comparator circuits 130 in odd-numbered pixel columns in the above example, the comparator circuits 130 in the odd-numbered pixel columns are the comparator circuits 131. Since the reset signal CRES2 is input into the comparator circuits 130 in even-numbered pixel columns, the comparator circuits 130 in the even-numbered pixel columns are the comparator circuits 132. The reset signal CRES1 is used to reset the threshold voltage Vth of each comparator circuit 131. The reset signal CRES2 is used to reset the threshold voltage Vth of each comparator circuit 132. At least two comparator circuits 131 and at least two comparator circuits 132 are provided. Accordingly, the multiple the comparator circuits 130 include four or more comparator circuits 130 that are arranged in line.

A reset signal line 310 through which the reset signal CRES1 is transmitted is commonly connected to the multiple comparator circuits 131, among the comparator circuits 130. A reset signal line 320 through which the reset signal CRES2 is transmitted is commonly connected to the multiple comparator circuits 132, among the comparator circuits 130.

A shield line 300 is provided for a pair of the reset signal line 310 and the reset signal line 320 in order to reduce mutual interference between the reset signal line 310 and the reset signal line 320. The shield line 300 in this example is provided between the reset signal line 310 and the reset signal line 320. It is sufficient for the distance between the reset signal line 310 and the shield line 300 and the distance between the reset signal line 320 and the shield line 300 to be shorter than the distance between the reset signal line 310 and the reset signal line 320. The arrangement of the shield line 300 near both the reset signal line 310 and the reset signal line 320 in the above manner enables the mutual interference between the reset signal line 310 and the reset signal line 320 to be reduced. Fixed shield potential SHLD1, such as ground potential or power supply potential, is supplied to the shield line 300. The voltage of the shield line 300 is substantially kept at a constant value with the shield potential SHLD1 at least while the comparator circuit 130 is performing the comparison operation. However, although the voltage of the shield line 300 may be slightly varied strictly due to the interference between the reset signal line 310 and the shield line 300 or the interference between the reset signal line 320 and the shield line 300, such a state may be considered as the state in which the voltage of the shield potential SHLD1 is substantially kept at a constant value. The shield potential SHLD1 to be supplied to the shield line 300 may have different values in different operation modes.

Voltage input from the outside of the imaging apparatus IS into a pad 31 may be used as the shield potential SHLD1. The power supply potential is used as the shield potential SHLD1 in this example. The power supply potential is supplied from the pad 31 to the multiple comparator circuits 131 and the multiple comparator circuits 132 in this example. In other words, the common potential is supplied to the shield line 300 and the power supply terminals of the multiple comparator circuits 131 and the multiple comparator circuits 132. Accordingly, the difference between the voltage of the shield line 300 and a high level (H) of the comparison signal, which is output from the comparator circuit 130, is smaller than the difference between the voltage of the shield line 300 and a low level (L) of the comparison signal, which is output from the comparator circuit 130. This enables the interference between the reset signal lines 310 and 320 and the shield line 300 to be suppressed when the output from the comparator circuit 130 is inverted from the low level to the high level. Ground potential GND1 is supplied to the pixel area 10 from a pad 30, which is different from the pad 31 through which the shield potential SHLD1 is input.

A color filter array may be arranged in the pixel area 10. The color of light detected in each pixel 100 is varied depending on the color (wavelength) of light transmitting through each color filter composing the color filter array. In the pixels 100 illustrated in FIG. 1, the pixels 100 that detect red light are red pixels R, the pixels 100 that detect green light are green pixels Gb or green pixels Gr, and the pixels 100 that detect blue light are blue pixels B. In this example, the red pixels R and the green pixels Gb are alternately arranged in the odd-numbered pixel columns, such as the first pixel column and the third pixel column. The first to fourth pixel columns here are names given to the respective pixel columns for convenience. The first to fourth pixel columns are not necessarily arranged in order and another pixel column may be disposed between the first pixel column and the second pixel column. The same applies to the following description. In this example, the blue pixels B and the green pixels Gr are alternately arranged in the even-numbered pixel columns, such as the second pixel column and the fourth pixel column. Accordingly, the pixel signal PIX based on the outputs from the green pixels Gb and the pixel signal PIX based on the outputs from the red pixels R are alternately input into the multiple comparator circuits 131 in time series in this example. The pixel signal PIX based on the outputs from the green pixels Gr and the pixel signal PIX based on the outputs from the blue pixels B are alternately input into the multiple comparator circuits 132 in time series in this example. The color filter array is not limited to the above Bayer pattern and may not be provided.

Figure 2A:
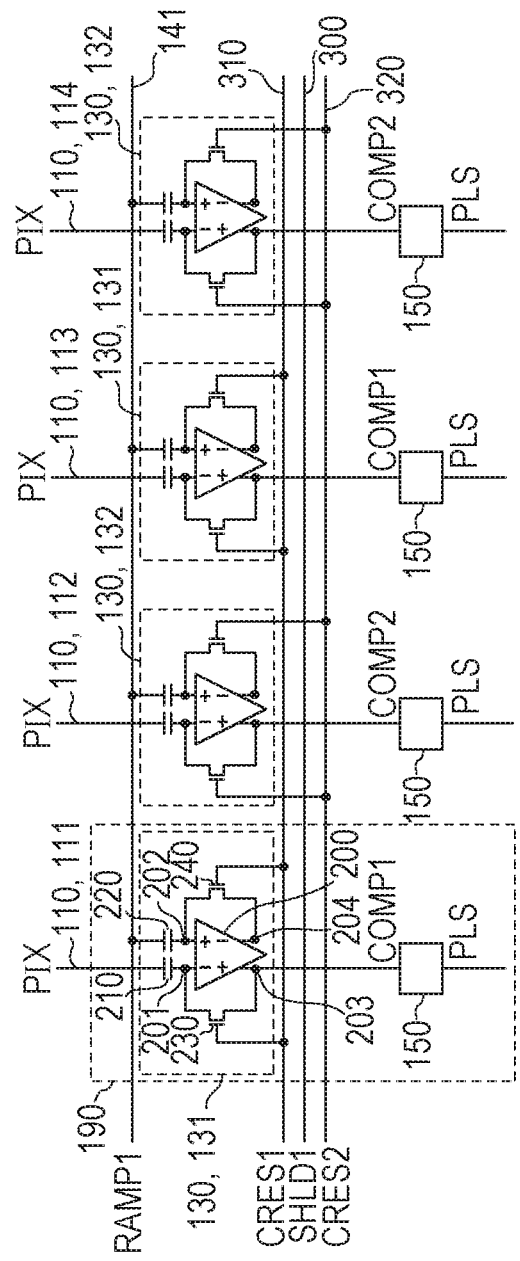
FIGS. 2A to 2C are schematic diagrams describing exemplary configurations of the imaging apparatus.
Figure 2B:
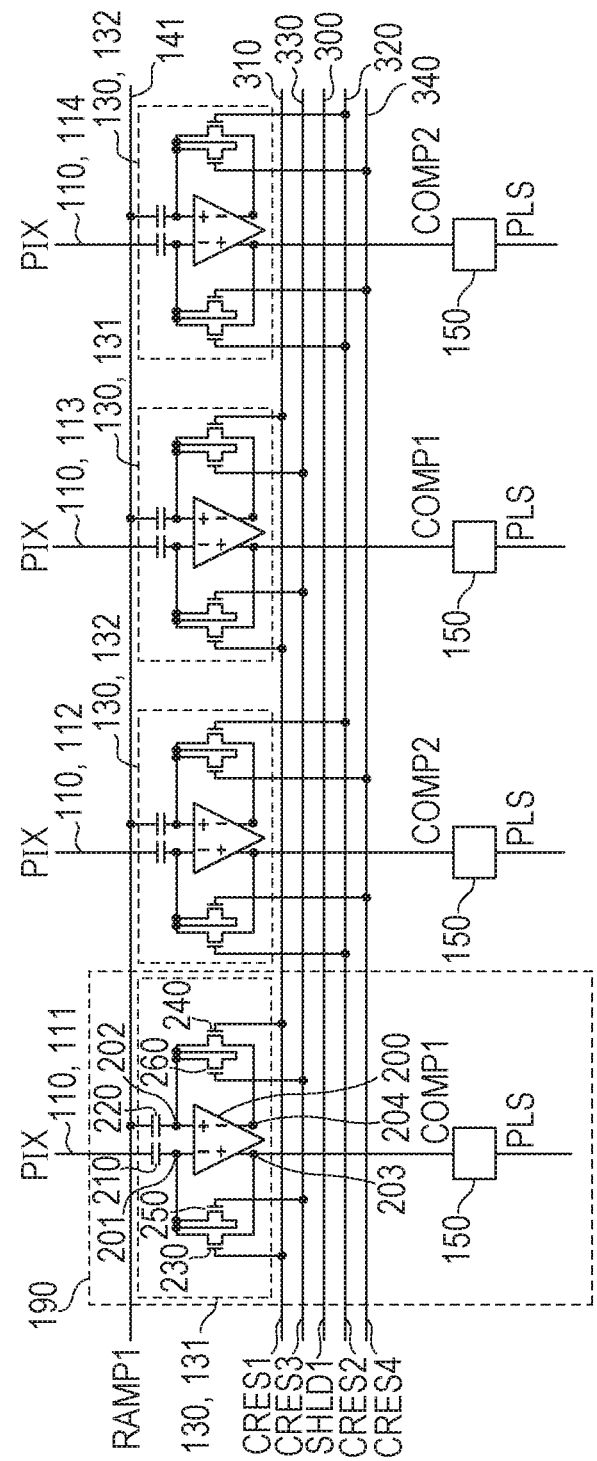
Figure 2C:
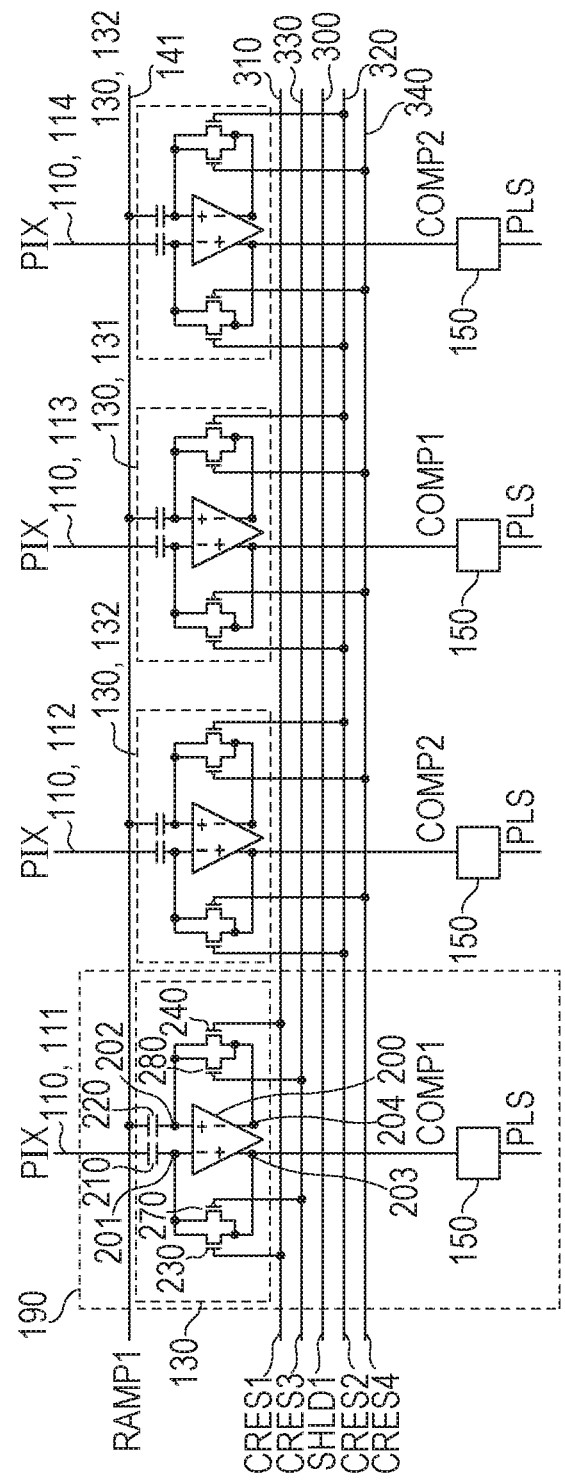

FIGS. 2A to 2C illustrate three examples of equivalent circuits of the AD converters 190 of four columns. Points common to the three examples will now be described with reference to FIG. 2A.

Each of the multiple comparator circuits 130 includes a comparator 200. The comparator 200 includes an input terminal 201 corresponding to the pixel signal PIX and an input terminal 202 corresponding to the reference signal RAMP1. The comparator 200 includes an output terminal 203 through which the comparison signal COMP is output and an output terminal 204 through which an inversion signal RCMP of the comparison signal COMP is output. The input terminal 201 and the input terminal 202 are inputs of a differential pair composing the comparator 200.

Each of the multiple comparator circuits 130 includes a capacitance 210 with which a signal line 110 through which the pixel signal PIX is transmitted is connected to the input terminal 201 corresponding to the pixel signal PIX. Each of the multiple comparator circuits 130 includes a capacitance 220 with which the reference signal line 141 through which the reference signal RAMP1 is transmitted is connected to the input terminal 202 corresponding to the reference signal RAMP1. In other words, the pixel signal PIX is input into the comparator 200 via the capacitance 210 and the reference signal RAMP1 is input into the comparator 200 via the capacitance 220.

Each of the multiple comparator circuits 130 includes a transistor 230. One of the source and the drain of the transistor 230 is connected to the input terminal 201 of the comparator 200 and the other of the source and the drain of the transistor 230 is connected to the output terminal 203 of the comparator 200. The gate of the transistor 230 of each of the multiple comparator circuits 131, among the multiple comparator circuits 130, is connected to the reset signal line 310. The gate of the transistor 230 of each of the multiple comparator circuits 132, among the multiple comparator circuits 130, is connected to the reset signal line 320.

Each of the multiple comparator circuits 130 includes a transistor 240. One of the source and the drain of the transistor 240 is connected to the input terminal 202 of the comparator 200 and the other of the source and the drain of the transistor 240 is connected to the output terminal 204 of the comparator 200. The gate of the transistor 240 of each of the multiple comparator circuits 131, among the multiple comparator circuits 130, is connected to the reset signal line 310. The gate of the transistor 240 of each of the multiple comparator circuits 132, among the multiple comparator circuits 130, is connected to the reset signal line 320.

The reset signal CRES1 or the reset signal CRES2 is input into each of the multiple comparator circuits 130, in addition to the reference signal RAMP1 and the pixel signal PIX described above. In the example in FIG. 2A, the reset signal CRES1 is input into the comparator circuits 131 of the odd-numbered pixel columns and the reset signal CRES2 is input into the comparator circuits 132 of the even-numbered pixel columns.

Each of the multiple AD converters 190 includes a pulse generator 150 that outputs a pulse PLS in synchronization with the change (inversion) of the voltage level of the comparison signal COMP. The digital memories 151 and 152 illustrated in FIG. 1 acquire the data (digital values) on the data lines 161 and 162, respectively, using the pulse PLS output from the pulse generator 150 as a trigger.

In the second example illustrated in FIG. 2B, each of the multiple comparator circuits 130 includes a transistor 250 and a transistor 260. The transistor 250 is used to control coupling between the input terminal 201 and an inversion signal line 330. The transistor 250 is a transistor that connects the input terminal 201 to the transistor 230. The transistor 260 is used to control coupling between the input terminal 202 and the inversion signal line 330. The transistor 260 is a transistor that connects the input terminal 202 to the transistor 240.

In the third example illustrated in FIG. 2C, each of the multiple comparator circuits 130 includes a switch 270 and a switch 280. The switch 270 is used to control conduction and non-conduction between the input terminal 201 and the output terminal 203. The switch 270 is a transistor that connects the input terminal 201 to the output terminal 203, like the transistor 230. The transistor 230 is of one of an N type and a P type (the N type in this example) and the switch 270 is of the other of the N type and the P type (the P type in this example). The transistor 230 and the switch 270 compose a complementary metal oxide semiconductor (CMOS) switch.

The switch 280 is used to control conduction and non-conduction between the input terminal 202 and the output terminal 204. The switch 280 is a transistor that connects the input terminal 202 to the output terminal 204, like the transistor 240. The transistor 240 is of one of the N type and the P type (the N type in this example) and the switch 280 is of the other of the N type and the P type (the P type in this example). The transistor 240 and the switch 280 compose a CMOS switch.

In the examples in FIG. 2B and FIG. 2C, with regard to the comparator circuits 131, a control electrode of the transistor 250, 260 or the switch 270, 280 (the gate of the transistor) is connected to the inversion signal line 330. An inversion signal CRES3, which is an inversion signal of the reset signal CRES1, is transmitted through the inversion signal line 330. With regard to the comparator circuits 132, a control electrode of a transistor similar to the transistor 250, 260 or the switch 270, 280 (the gate of the transistor) is connected to an inversion signal line 340. An inversion signal CRES4, which is an inversion signal of the reset signal CRES2, is transmitted through the inversion signal line 340.

The use of the transistors 250 and 260 and the switches 270 and 280 suppresses voltage fluctuation occurring in the differential input of the comparator 200 when the transistor 230 or 240 is turned off.

The shield line 300 is not provided between the reset signal line 310 and the inversion signal line 330 and between the reset signal line 320 and the inversion signal line 340. The shield line 300 is provided only between the inversion signal line 330 and the reset signal line 320, among adjacent pairs of the reset signal line 310, the reset signal line 320, the inversion signal line 330, and the inversion signal line 340. This makes the distance between the reset signal line 310 and the inversion signal line 330 shorter than the distance between the reset signal line 310 and the reset signal line 320. This also makes the distance between the reset signal line 310 and the inversion signal line 330 shorter than the distance between the reset signal line 310 and the shield line 300. The inversion signal line 340 is positioned at the opposite side of the shield line 300 with respect to the reset signal line 320. In other words, the reset signal line 320 is positioned between the inversion signal line 340 and the shield line 300. This makes the distance between the reset signal line 310 and the shield line 300 longer than the distance between the reset signal line 320 and the shield line 300. The reset signal line 310 easily couples with the input terminal 201 corresponding to the pixel signal and the output terminal 203 through which the comparison signal is output. Accordingly, it is desirable to asymmetrically arrange the reset signal line 310 and the reset signal line 320 with respect to the shield line 300 to reduce the interference to the reset signal line 310. With the above configuration, it is possible to reduce the difference in the AD conversion due to the interference between the comparator circuits 130 while decreasing the number of the lines and the area of the AD converter 190.

Figure 3A:
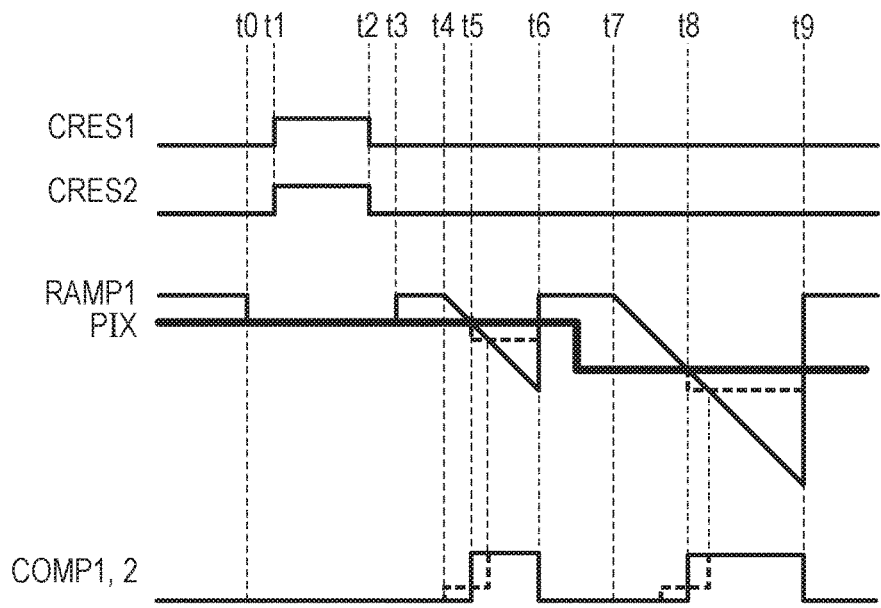
FIGS. 3A and 3B are schematic diagrams describing exemplary operations of the imaging apparatus.
Figure 3B:
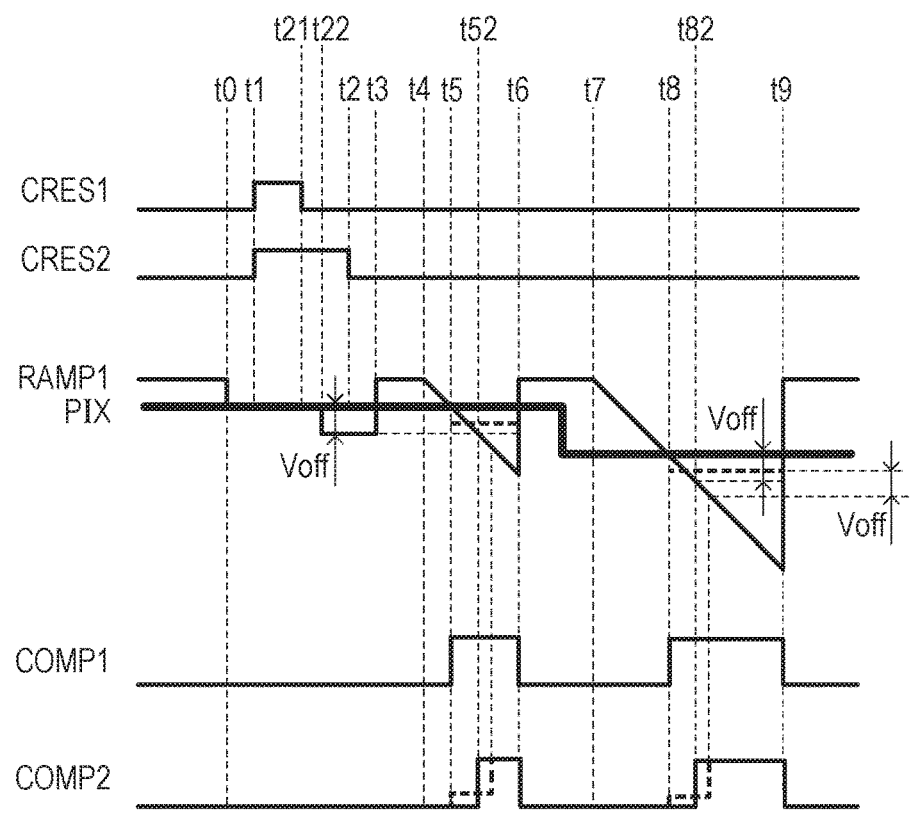

FIGS. 3A and 3B illustrate two examples of the waveforms of the input signals into the comparator circuit 130 and the output signals from the comparator circuit 130. Points common to the two examples will now be described with reference to FIG. 3A. In the waveforms illustrated in FIGS. 3A and 3B, the level of the pulse signal at which the N-type transistor is in a conductive state (on state) is the low level and the level of the pulse signal at which the N-type transistor is in a non-conductive state (off state) is the high level. The level of the pulse signal at which the P-type transistor is in the conductive state (on state) is the high level and the level of the pulse signal at which the P-type transistor is in the non-conductive state (off state) is the low level. Light of higher luminance, that is, higher intensity is incident on the comparator circuit 130 as the voltage of the pixel signal PIX of the present embodiment is decreased.

Referring to FIG. 3A, the voltage of the reference signal RAMP1 is decreased at a time t0 and the reset signals CRES1 and CRES2 are set to the high level from a time t1 to a time t2. The threshold voltage Vth is reset in a state in which the pixel signal PIX of the amount of noise and the reference signal RAMP1 are input. From the time t1 to the time t2, both the transistor 230 and the transistor 240 are in the on state, that is, the input terminal 201 and the output terminal 203 are short-circuited and the input terminal 202 and the output terminal 204 are short-circuited. The difference in voltage between the input terminal 201 and the input terminal 202 at the last time (corresponding to the time t2) of this state is set as the threshold voltage Vth. The operation to set the threshold voltage Vth in the above manner is referred to as resetting or auto-zeroing of the comparator 200 or the comparator circuit 130. Since the threshold voltage Vth is based on the timing of the pulses of the reset signals CRES1 and CRES2, it may be said that the reset signal CRES1 resets the threshold voltage Vth.

When the voltage of the reference signal RAMP1 is varied with time from a time t4 after the voltage of the reference signal RAMP1 is increased at a time t3, the outputs from the comparator circuits 130 are simultaneously inverted at about a time t5. When comparison signals COMP1 and COMP2, which are output from the comparator circuits 130, are inverted from the low level to the high level, the pulse generator 150 generates the pulse PLS for a short time of one shot. The pulse generator 150 supplies the pulse PLS to the digital memory 151 and the digital memory 151 acquires the data on the data line 161 at that time. The AD conversion is performed without being affected by the variation in the noise component in each pixel 100 through the above reset operation.

The pixel signal PIX is switched from a level indicating the amount of noise to a level indicating the amount of signal between a time t6 to a time t7. The level of the amount of signal is generally higher than that of the amount of noise.

After the reference signal RAMP1 is increased at the time t6, the reference signal RAMP1 is varied with time from the time t7. The AD conversion of the amount of signal is performed in a state in which the signal that does not correspond to the amount of noise but corresponds to the amount of signal is output from the pixel. At a time t8 at which the outputs from the comparator circuits 130 are inverted, the pulse generator 150 generates the pulse for a short time of one shot. The pulse generator 150 supplies the pulse to the digital memory 152 and the digital memory 152 acquires the data on the data line 162 at that time. The inversion timing of each column depends on the level indicating the amount of signal of the pixel signal PIX of each column.

As described above, in the AD conversion of the level indicating the amount of noise, the outputs from the many comparator circuits 130 are simultaneously inverted. In addition, for example, when an image of an object that is not horizontally varied is captured, the outputs from the many comparator circuits 130 are simultaneously inverted also in the AD conversion of the level indicating the amount of signal. At this time, the output terminal 203 of the comparator circuit 130 couples with the capacitance between the gate and the drain of the transistor 230 and the capacitance between the reset signal lines 310 and 320. Such a phenomenon causes the interference between the comparator circuits 130 to shift the inversion timing of the outputs from the comparator circuits 130. As a result, a difference may occur in the result of the AD conversion. In other words, the voltage of the reset signal CRES1 or the reset signal CRES2 is varied due to the inversion of the outputs from the comparator circuits 130 of the other columns. The variation in the voltage of the reset signal CRES1 or the reset signal CRES2 affects the input into the comparator circuit 130 and the output from the comparator circuit 130 via the capacitance between the gate and the drain of the transistor 230 or 240 or the capacitance between the gate and the source thereof to cause the shift in the inversion timing. In the present embodiment, the provision of the two reset signal lines: the reset signal line 310 and the reset signal line 320 enables the voltage fluctuation to be suppressed, compared with a case in which one reset signal line is provided. In contrast, if the coupling occurs between the reset signal line 310 and the reset signal line 320 due to parasitic capacitance, the interference occurs between the columns using the reset signal CRES1 and the columns using the reset signal CRES2. This increases the difference in the result of the AD conversion. Referring to FIGS. 3A and 3B, the voltage fluctuations caused by the coupling in the pixel signal PIX and the comparison signals COMP1 and COMP2 are illustrated with broken lines. The interference from the comparison signals COMP1 and COMP2 to the pixel signal PIX due to the coupling causes the shift in the timing when the comparison signals COMP1 and COMP2 are inverted. The interference from the comparison signal COMP1 to the comparison signal COMP2 due to the coupling causes the voltage fluctuation of the comparison signals COMP1 and COMP2. If the voltage fluctuation of the comparison signals COMP1 and COMP2 exceeds a threshold value of the logic level in a downstream circuit (the pulse generator 150 in this example), the pulse generator 150 may output a pulse at inaccurate timing.

In order to resolve the above problems, the provision of the shield line 300 between, for example, the reset signal lines 310 and 320, as illustrated in FIGS. 2A to 2C, enables the interference between the columns using the reset signal line 310 and the columns using the reset signal line 320 to be reduced. As a result, the difference in the result of the AD conversion is capable of being reduced. Since the reset signal lines 310 and 320 directly have the coupling capacitance with the outputs from the comparator circuits 130 and the comparator circuits 130 can simultaneously perform the inversion operation, as described above, the voltage fluctuation is easy to occur due to the inversion operation. Accordingly, it is desirable to provide the shield line 300 between the reset signal lines 310 and 320 even if the number of the lines is increased. In addition, it is desirable to provide buffers that drive the reset signal lines 310 and 320 not at one side but at both sides to make the AD converter 190 less likely to be affected by the voltage fluctuation although the buffers are not illustrated in the above examples. The accuracy of comparison in the comparator circuits 130 is increased by suppressing the coupling between the input terminals 201 and 202 and the output terminal 203 via the reset signal lines 310 and 320 with the shield line 300 in the above manner.

FIG. 3B illustrates a modification of the driving waveforms of the reference signal RAMP1, the reset signal CRES1, and the reset signal CRES2, which are different from those in FIG. 3A. In the example in FIG. 3B, the reference signal RAMP1, the reset signal CRES1, and the reset signal CRES2 are set so that the threshold voltage of each of the multiple comparator circuits 131 is different from the threshold voltage of each of the multiple comparator circuits 132. Points different from FIG. 3A will be described.

Referring to FIG. 3B, the reset signal CRES1 makes transition from the high level to the low level at a time t21 and the reset signal CRES2 makes transition from the high level to the low level at a time t2, which is different from the time t21. The voltage of the reference signal RAMP1 at the time t21 is different from that at the time t2. Accordingly, the voltages of the input terminal 201 and the input terminal 202 in resetting in the comparator circuit 131 are different from those in the comparator circuit 132 in FIGS. 2A to 2C. The threshold voltage of the comparator circuit 132 is reset to voltage Voff corresponding to the difference in voltage between the reference signal RAMP1 and the pixel signal PIX at the time t2. As a result, in the AD conversion of the level indicating the amount of noise, the comparison signal COMP1 output from the comparator circuit 131 is inverted at a time t5 while the comparison signal COMP2 output from the comparator circuit 132 is inverted at a time t52. In the AD conversion of the level indicating the amount of signal, the comparison signal COMP1 is inverted at a time t8 while the comparison signal COMP2 is inverted at a time t82. The voltage of the reference signal RAMP1 at the time t5 differs from the voltage of the reference signal RAMP1 at the time t52 by an amount that is nearly equal to the voltage Voff, and the voltage of the reference signal RAMP1 at the time t8 differs from the voltage of the reference signal RAMP1 at the time t82 by an amount that is nearly equal to the voltage Voff. It is possible to reduce the difference in the result of the AD conversion due to the interference between the columns by shifting the inversion timing of the comparator circuit 131 from the inversion timing of the comparator circuit 132 through the above operation to decrease the number of the comparator circuits 130 the outputs from which are simultaneously inverted. However, also in this case, for example, simultaneous inversion of the comparator circuits 132 at a time t7 may vary the voltage of the reset signal CRES1. If the variation in the voltage of the reset signal CRES1 is transmitted to the comparator circuits 131 through the reset signal line 320, the inversion timing of the comparator circuits 131 may be shifted from the time t8. Accordingly, also in this case, the provision of the shield line 300 between, for example, the reset signal lines 310 and 320, as illustrated in FIGS. 2A to 2C, enables the interference between the comparator circuits 130 using the reset signal line 310 and the comparator circuits 130 using the reset signal line 320 to be reduced. As a result, it is possible to reduce the difference in the result of the AD conversion.

Figure 4:
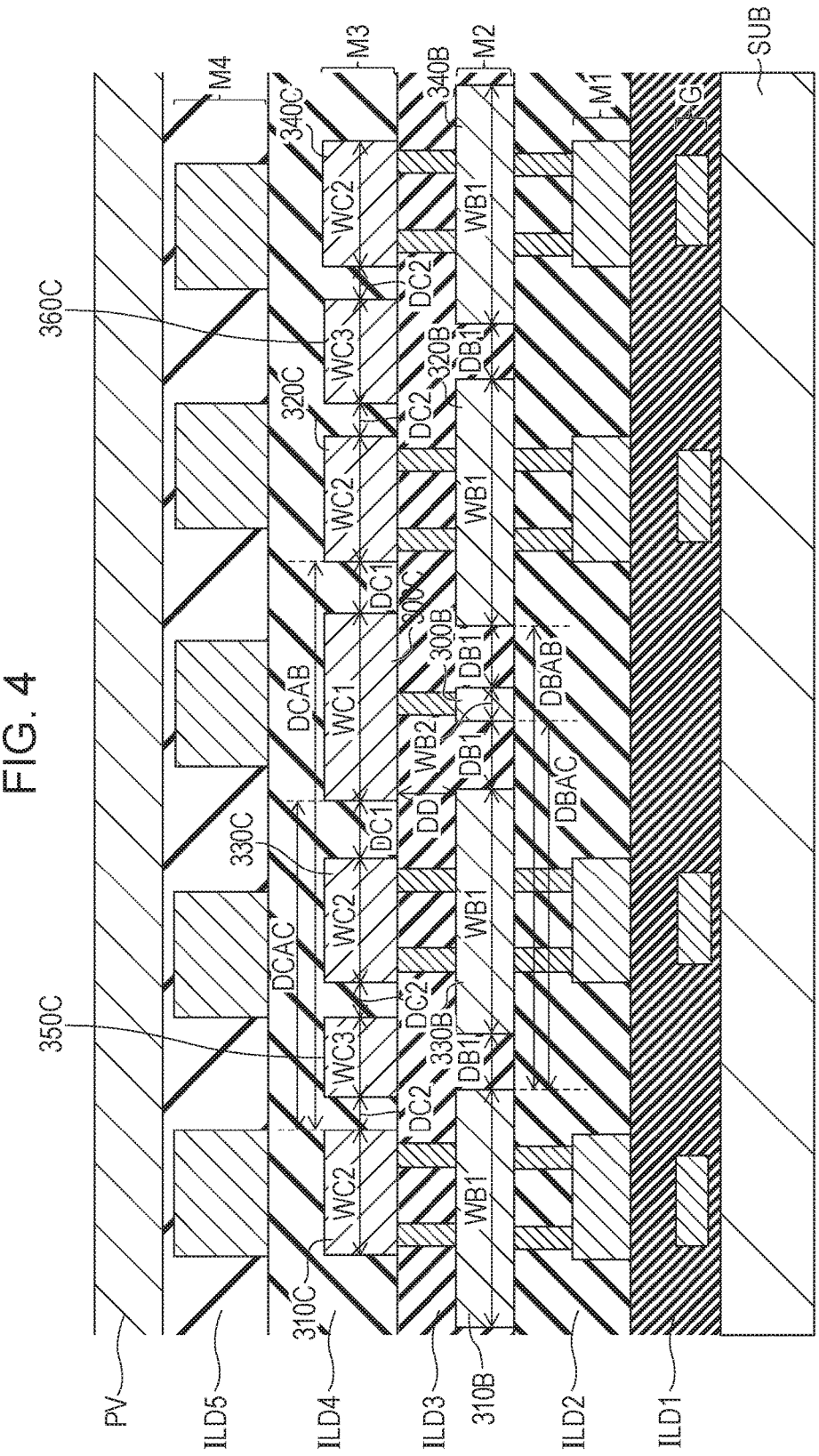
FIG. 4 is a schematic diagram describing an exemplary structure of the imaging apparatus.

The positional relationship between the shield line 300 and the reset signal lines 310 and 320 will now be described in detail with reference to FIG. 4. FIG. 4 corresponds to the example illustrated in FIG. 2B in which the inversion signal lines 330 and 340 are provided.

FIG. 4 is a cross-sectional view of an imaging device IC in the imaging apparatus IS. Referring to FIG. 4, a gate electrode layer G made of polysilicon and wiring layers M1, M2, M3, and M4 each composed of an aluminum line are disposed in this order on a semiconductor substrate SUB. Each of the wiring layers M1, M2, M3, and M4 may be composed of a copper line. Interlayer insulating layers ILD1, ILD2, ILD3, ILD4, and ILD5 are provided between the semiconductor substrate SUB and the wiring layers M1, M2, M3, and M4. The wiring layer M1 is connected to the semiconductor substrate SUB or the gate electrode layer G with a contact plug (not illustrated) interposed therebetween. The wiring layers M1, M2, M3, and M4 are connected to each other with via plugs interposed therebetween. A passivation layer PV is provided over the interlayer insulating layer ILD5 and the wiring layer M4.

Each of the shield line 300, the reset signal lines 310 and 320, and the inversion signal lines 330 and 340 is at least composed of the wiring layer M2 and the wiring layer M3 that are connected to each other. In the wiring layer M2, a line 300B composes the shield line 300, a line 310B composes the reset signal line 310, and a line 320B composes the reset signal line 320. In the wiring layer M2, a line 330B composes the inversion signal line 330 and a line 340B composes the inversion signal line 340. Similarly, in the wiring layer M3, a line 300C composes the shield line 300, a line 310C composes the reset signal line 310, and a line 320C composes the reset signal line 320. In the wiring layer M3, a line 330C composes the inversion signal line 330 and a line 340C composes the inversion signal line 340. In the wiring layer M3, a line 350C is provided between the line 310C and the 330C and a line 360C is provided between the line 320C and the line 340C. The line 350C and the line 360C conduct to none of the lines 310C, 320C, 330C, and the 340C.

A range of the widths of the lines 310B, 320B, 330B, and 340B is defined as a width WB1. A preferred range of the width of the line 300B is defined as a width WB2. A preferred range of the width of the line 300C is defined as a width WC1. A preferred range of the widths of the line 310C, 320C, 330C, and 340C is defined as a width WC2. A preferred range of the widths of the line 350C and the line 360C is defined as a width WC3. A preferred range of the distance between adjacent lines in the wiring layer M2 is defined as a distance DB1. Preferred ranges of the distances between adjacent lines in the wiring layer M3 are defined as distance DC1 and DC2. A preferred range of the distance between the wiring layer M2 and the wiring layer M3 is defined as a distance DD.

In the wiring layer M2, a distance DBAC between the line 310B and the line 300B and the distance DB1 between the line 320B and the line 300B are shorter than a distance DBAB between the line 310B and the line 320B. In the wiring layer M3, a distance DCAC between the line 310C and the line 300C and the distance DC1 between the line 320C and the line 300C are shorter than a distance DCAB between the line 310C and the line 320C. The arrangement of the shield line 300 and the reset signal lines 310 and 320 in the above manner enables the interference between the reset signal line 310 and the reset signal line 320 to be suppressed with the shield line 300.

Since the distance DD is sufficiently shorter than the distance DBAB and the distance DBAC in this example, the distance between the line 310B and the line 300C and the distance between the line 320B and the line 300C are also shorter than the distance DBAC. Similarly, the distance between the line 310C and the line 300B and the distance between the line 320C and the line 300B is also shorter than the distance DCAC. Accordingly, the provision of the shield line 300 and the reset signal line 310 or the shield line 300 and the reset signal line 320 on different wiring layers, instead of on the same wiring layer, achieves a sufficient shield effect.

It is desirable to adopt relationship WB2<WC3≤WC2<WC1≤WB1, for example, relationship WB2<WC3<WC2<WC1<WB1 in order to improve the shield performance of the shield line 300. Although all of the five widths: the width WB1, the width WB2, the width WC1, the width WC2, and the width WC3 desirably establish the above relationship, it is sufficient for at least two widths of the five widths to establish the above relationship. In particular, the width WC2 of the line 310C composing the reset signal line 310 in the wiring layer M3 is preferably smaller than the width WB1 of the line 310B composing the reset signal line 310 in the wiring layer M2. Similarly, the width WC2 of the line 320C composing the reset signal line 320 in the wiring layer M3 is preferably smaller than the width WB1 of the line 320B composing the reset signal line 320 in the wiring layer M2. In contrast, the width WC1 of the line 300C composing the shield line 300 in the wiring layer M3 is preferably greater than the width WB2 of the line 300B composing the shield line 300 in the wiring layer M2. The width WB2 of the line 300B is preferably smaller than the width WB1 of the line 310B and the width WB1 of the line 320B.

In addition, it is desirable to adopt relationship DC2≤DC1≤DB1, for example, relationship DC2<DC1<DB1 in order to improve the shield performance of the shield line 300.

The distance DBAC and the distance DCAC are, for example, longer than or equal to 1 μm and shorter than or equal to 10 μm and are preferably longer than or equal to 2 μm and shorter than or equal to 6 μm. The distances DC2, DC1, and DB1 are, for example, longer than or equal to 0.1 μm and shorter than or equal to 1.0 μm and are preferably longer than or equal to 0.4 μm and shorter than or equal to 0.8 μm. The pitch of the pixel columns and the pitch of the comparator circuits 130 are greater than or equal to 1 μm and smaller than or equal to 10 μm. The interval between adjacent pixel signal lines 110 and the interval between the signal lines through which the comparison signals COMP of adjacent comparator circuits 130 are output are, for example, greater than or equal to 1 μm and smaller than or equal to 10 μm, as in the pitch of the pixel columns. The distance DBAC and the distance DCAC may be smaller than the pitch of the pixel columns and the pitch of the comparator circuits 130. When the distance DBAC and the distance DCAC are smaller than the pitch of the comparator circuits 130, the influence of the interference between the reset signal lines 310 and 320 may be greater than the interference between the comparator circuits 130 and the interference between the signal lines for input into the comparator circuits 130 or the signal lines for output from the comparator circuits 130. It is particularly effective to use the shield line 300 in such a case. The distance between the digital signal line 181 and the digital signal line 182 may be smaller than the distance DBAC and the distance DCAC. For example, the distance between the digital signal line 181 and the digital signal line 182 may be nearly equal to the distance DC2, the distance DC1, and the distance DB1. The distance between the digital signal line 181 and the digital signal line 182 is, for example, longer than or equal to 0.1 μm and shorter than or equal to 1.0 μm and is preferably longer than or equal to 0.4 μm and shorter than or equal to 0.8 μm.

Figure 5A:
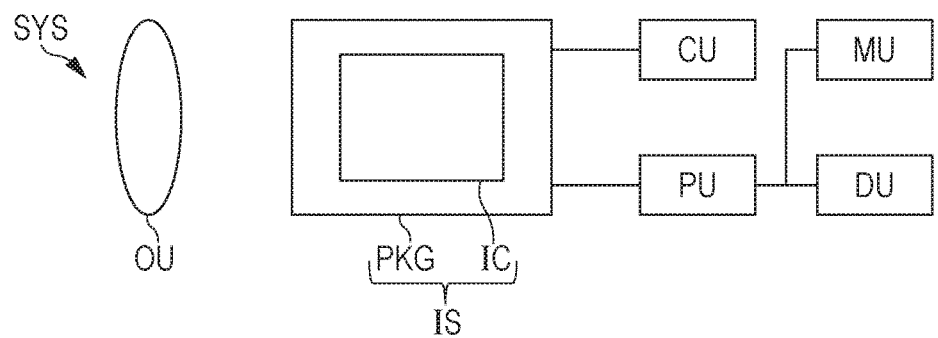
FIGS. 5A to 5E are schematic diagrams describing exemplary configurations of the imaging apparatus.

The configuration of the imaging apparatus IS will now be described with reference to FIGS. 5A to 5E. FIG. 5A illustrates an exemplary configuration of an imaging system SYS that is built using the imaging apparatus IS. The imaging system SYS is an information terminal having a camera and an imaging function. The imaging apparatus IS may further include a package PKG in which the imaging device IC is housed. The package PKG may include a base body to which the imaging device IC is fixed, a cover body which opposes the semiconductor substrate and which is made of glass or the like, and a connection member, such as bonding wire or a bump, which connects a terminal provided on the base body to a terminal provided on the imaging device IC.

The imaging system SYS may include an optical system OU that forms an image on the imaging apparatus IS. The imaging system SYS may also include at least one of a control unit CU, a processing unit PU, a display unit DU, and a storage unit MU. The control unit CU controls the imaging apparatus IS. The processing unit PU processes a signal output from the imaging apparatus IS. The display unit DU displays an image captured by the imaging apparatus IS and the storage unit MU stores an image captured by the imaging apparatus IS.

Figure 5B:
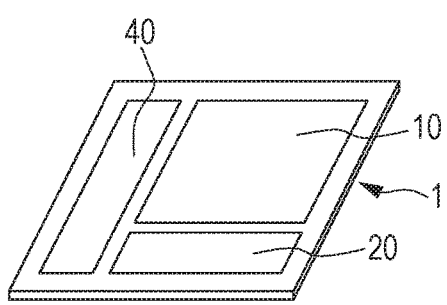
Figure 5C:
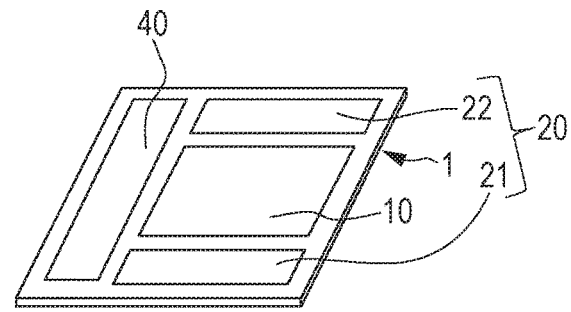

FIGS. 5B and 5C illustrates modes in which the imaging device IC in the imaging apparatus IS is composed of a single semiconductor chip. In the modes illustrated in FIGS. 5B and 5C, the pixel area 10, a signal processing area 20, and a control area 40 are provided on an imaging chip 1, which is a semiconductor chip. In the mode illustrated in FIG. 5C, the signal processing area 20 is divided into a first signal processing area 21 and a second signal processing area 22. The pixel area 10 is provided between the first signal processing area 21 and the second signal processing area 22.

Figure 5D:
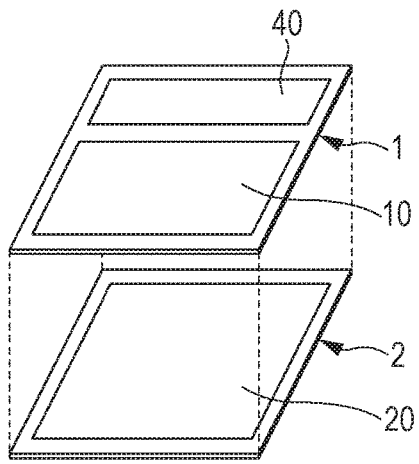
Figure 5E:
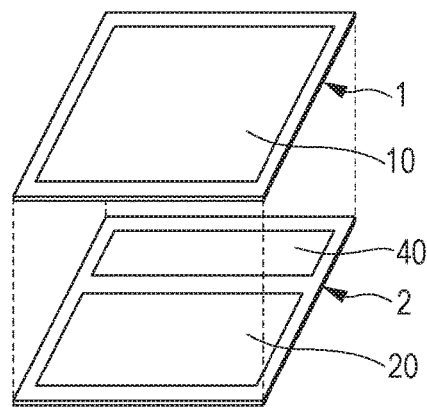

FIGS. 5D and 5E illustrates modes in which the imaging device IC in the imaging apparatus IS is composed of multiple semiconductor chips that are stacked. In the modes illustrated in FIGS. 5D and 5E, the imaging chip 1, which is a semiconductor chip, and a circuit chip 2, which is a semiconductor chip, are stacked. In the mode illustrated in FIG. 5D, the pixel area 10 and the control area 40 are provided on the imaging chip 1 and the signal processing area 20 is provided on the circuit chip 2. In the mode illustrated in FIG. 5E, the pixel area 10 is provided on the imaging chip 1 and the signal processing area 20 and the control area 40 are provided on the circuit chip 2.

Figure 6:
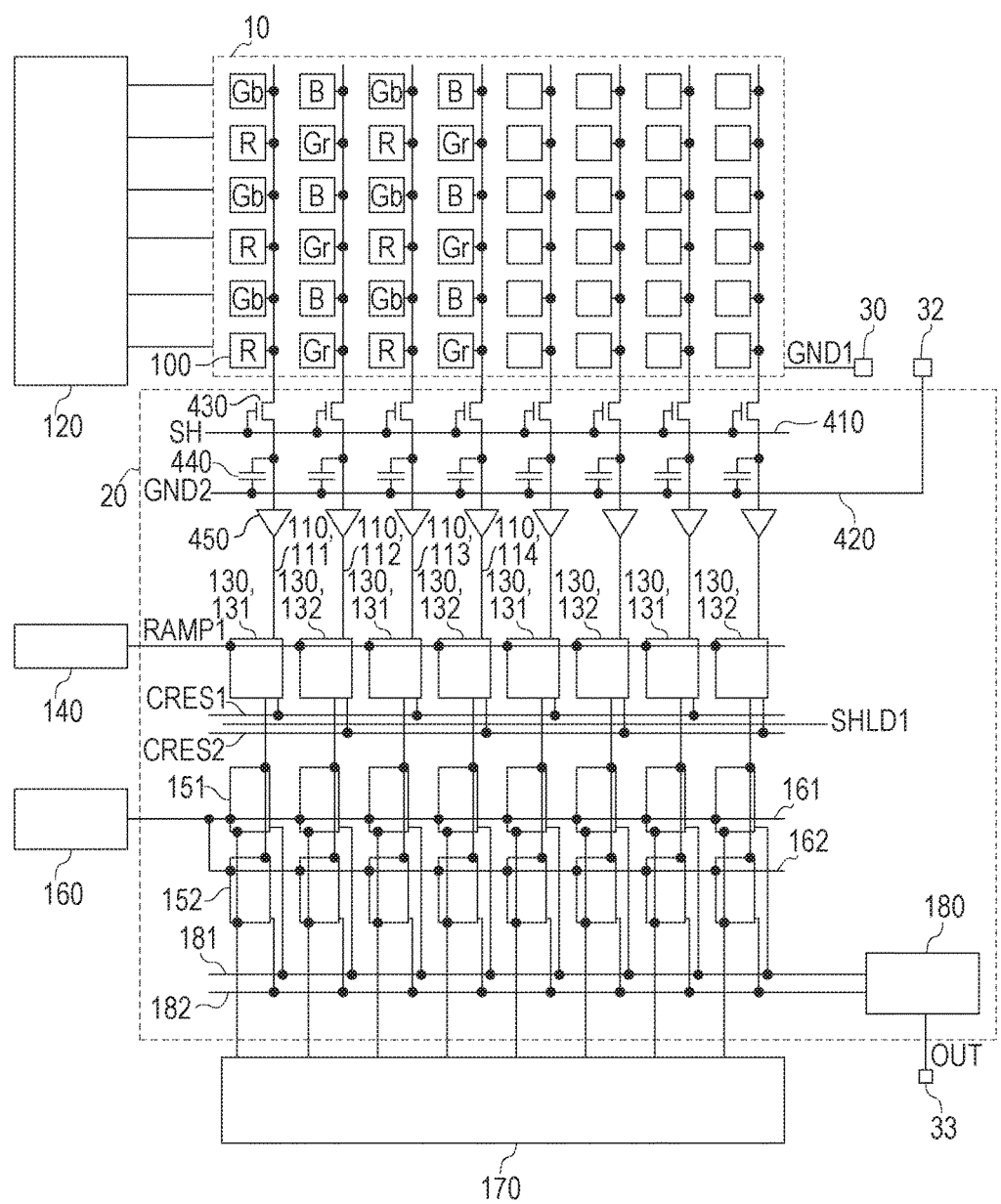
FIG. 6 is a schematic diagram describing an exemplary configuration of an imaging apparatus according to a modification.

A modification of the imaging apparatus IS will now be described with reference to FIG. 6. Only points different from the above examples are described here. As illustrated in FIG. 6, a transistor 430, a capacitance 440, and a buffer 450 are provided for each column on signal paths between the multiple pixels 100 and the multiple comparator circuits 130. The capacitance 440 holds the outputs from the corresponding pixels 100. The operation of the AD converter 190 and the operation of the pixels 100 are capable of being concurrently performed owing to a sample-holding operation performed by the transistor 430 and the capacitance 440. The sample-hold operation is controlled using a control signal SH transmitted through a signal line 410. For example, the pixels 100 are capable of being moved to a signal reading state while the signals from the pixels 100 in a reset state are being subjected to the AD conversion after the reset signals are sampled and held in the capacitance 440.

A ground line 420 is connected to one node of each of the multiple capacitances 440. Ground potential GND2 is supplied from a pad 32 to the ground line 420. The pad 32 is different from the pad 30, which supplies the ground potential GND1 to the pixel area 10. The supply of the ground potential GND1 of the pixels 100 and the ground potential GND2 to the capacitance 440 using the separate pads enables the concurrent operation of the pixels 100 and the AD converters 190 described above to be performed successfully.

Figure 7:
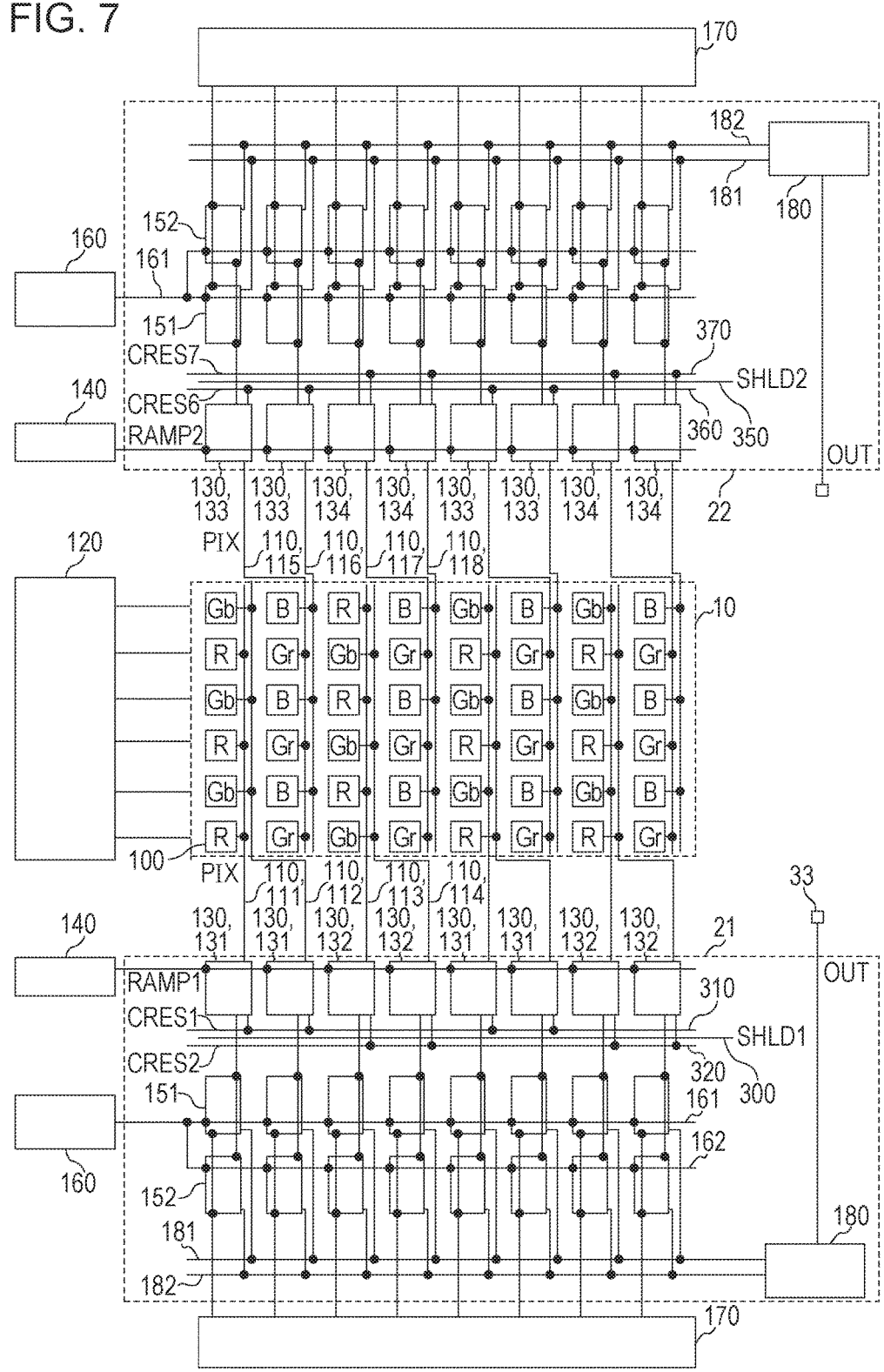
FIG. 7 is a schematic diagram describing an exemplary configuration of an imaging apparatus according to another modification.
Figure 8:
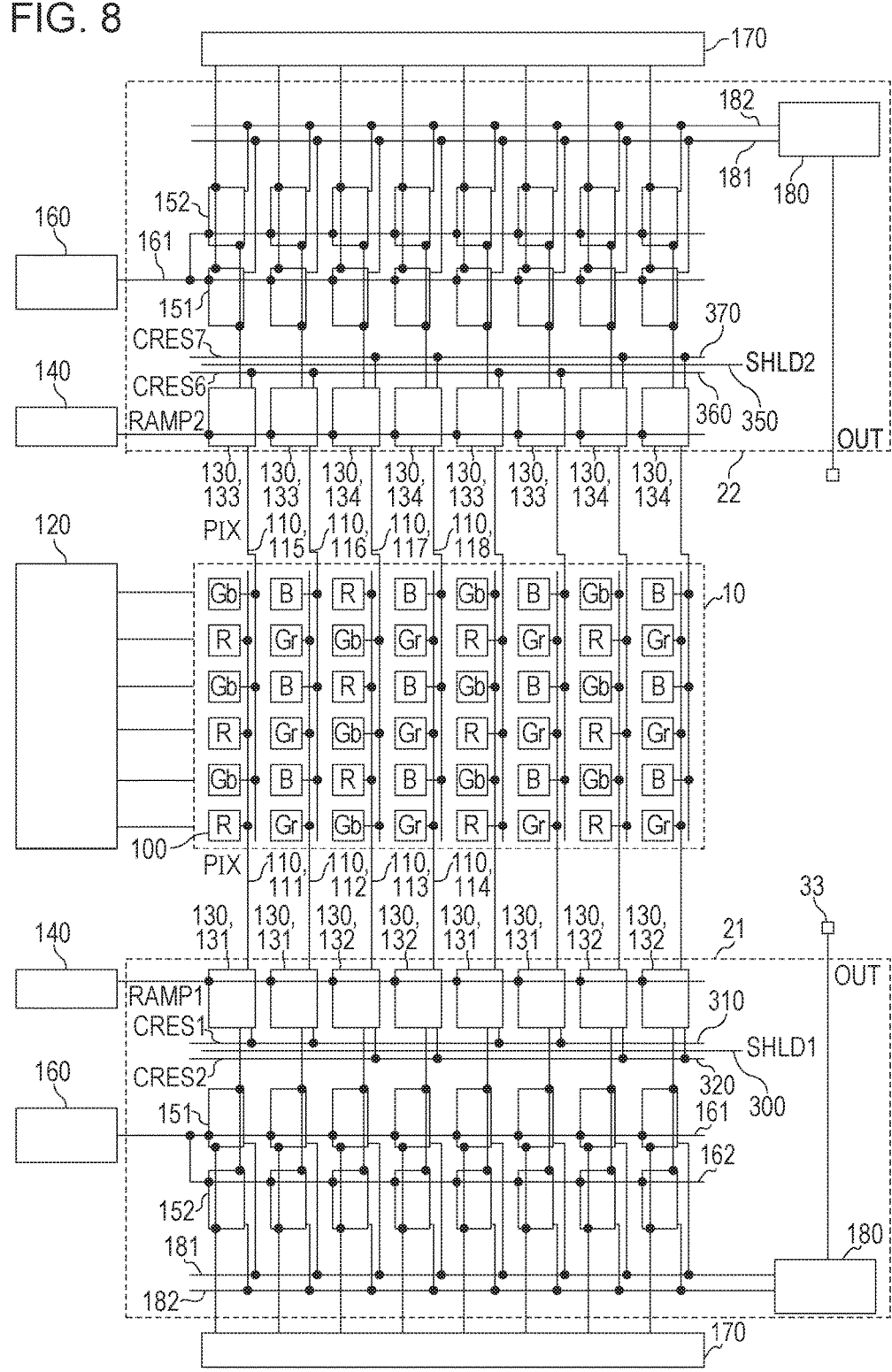
FIG. 8 is a schematic diagram describing an exemplary configuration of an imaging apparatus according to another modification.
Figure 9:
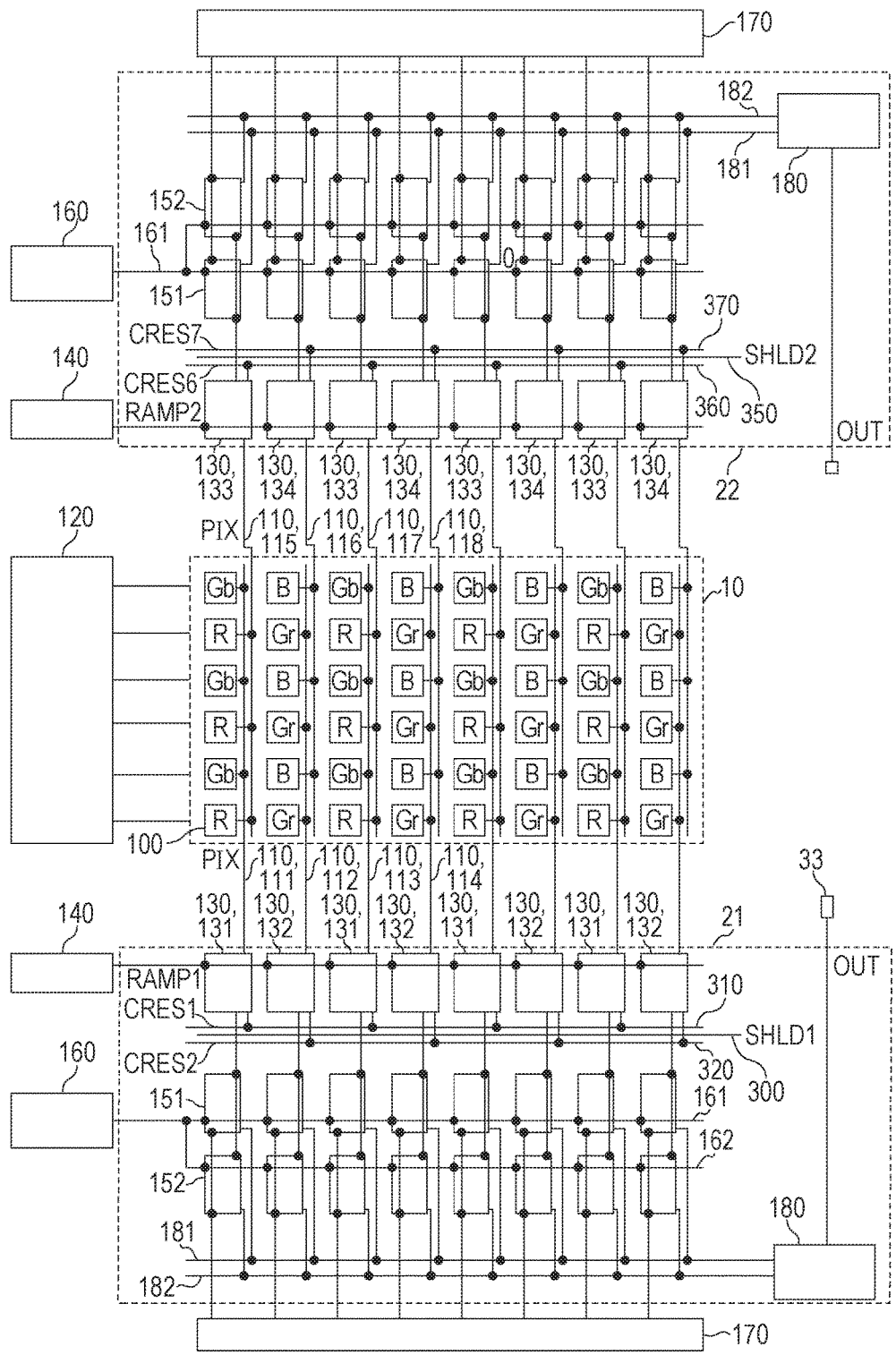
FIG. 9 is a schematic diagram describing an exemplary configuration of an imaging apparatus according to another modification.

Modifications of the imaging apparatus IS will now be described with reference to FIG. 7, FIG. 8, and FIG. 9. Only points different from the above examples are described here. FIG. 7, FIG. 8, and FIG. 9 correspond to the mode illustrated in FIG. 5C. Specifically, the signal processing area 21 is provided at one side (at the lower side) of the pixel area 10 and the signal processing area 22 is provided at the other side (at the upper side) of the pixel area 10. In other words, the pixel area 10 is provided between the signal processing area 21 and the signal processing area 22.

The signal processing area 21 and the signal processing area 22 may have equivalent circuit configurations. The signal processing area 21 may have a circuit configuration equivalent to that of the signal processing area 20 described above.

The multiple comparator circuits 130 having the configuration illustrated in FIG. 2A are provided also in the signal processing area 22. Multiple comparator circuits 133 and multiple comparator circuits 134, among the multiple comparator circuits 130, are arranged in line in the signal processing area 22. The pixel signal PIX based on the outputs from the pixels 100 in the pixel area 10 and a reference signal RAMP2 are input into each of the multiple comparator circuits 133 and 134.

A reset signal line 360 is provided in the signal processing area 22. The reset signal line 360 is commonly connected to the multiple comparator circuits 133 and a reset signal CRES6 used to reset a threshold voltage of each of the multiple comparator circuits 133 is transmitted through the reset signal line 360. A reset signal line 370 is provided in the signal processing area 22. The reset signal line 370 is commonly connected to the multiple comparator circuits 134 and a reset signal CRES7 used to reset a threshold voltage of each of the multiple comparator circuits 134 is transmitted through the reset signal line 370. In addition, a shield line 350 through which shield potential SHLD2 is supplied is provided in the signal processing area 22. The distance between the reset signal line 360 and the shield line 350 and the distance between the reset signal line 370 and the shield line 350 is shorter than the distance between the reset signal line 360 and the reset signal line 370. This enables the interference between the reset signal line 360 and the reset signal line 370 to be suppressed.

The reset signal line 360 through which the reset signal CRES6 is transmitted is a signal line having a function equivalent to that of the reset signal line 310 through which the reset signal CRES1 is transmitted. The reset signal line 370 through which the reset signal CRES7 is transmitted is a signal line having a function equivalent to that of the reset signal line 320 through which the reset signal CRES2 is transmitted. The shield line 350 through which the shield potential SHLD2 is supplied is a shield line having a function equivalent to that of the shield line 300 through which the shield potential SHLD1 is supplied. An inversion signal line having a function equivalent to that of the inversion signal line 330 may be disposed between the reset signal line 360 and the shield line 350 in the same manner as in FIG. 2B and FIG. 2C although the inversion signal line is omitted in FIG. 7. In addition, an inversion signal line having a function equivalent to that of the inversion signal line 340 may be disposed between the reset signal line 370 and the shield line 350.

In the example illustrated in FIG. 7, the two pixel signal lines 110 are provided for one pixel column. Specifically, a pixel signal line 111 with which the pixel area 10 is connected to the signal processing area 21 and a pixel signal line 112 with which the pixel area 10 is connected to the signal processing area 21 are provided for the first pixel column. A pixel signal line 115 with which the pixel area 10 is connected to the signal processing area 22 and a pixel signal line 116 with which the pixel area 10 is connected to the signal processing area 22 are provided for the second pixel column. A pixel signal line 113 with which the pixel area 10 is connected to the signal processing area 21 and a pixel signal line 114 with which the pixel area 10 is connected to the signal processing area 21 are provided for the third pixel column. A pixel signal line 117 with which the pixel area 10 is connected to the signal processing area 22 and a pixel signal line 118 with which the pixel area 10 is connected to the signal processing area 22 are provided for the fourth pixel column.

In the example illustrated in FIG. 7, the multiple comparator circuits 131 include the comparator circuits 131 into which the pixel signal PIX based on the outputs from the red pixels R of the first pixel column is input through the pixel signal line 111. The multiple comparator circuits 131 also include the comparator circuits 131 into which the pixel signal PIX based on the outputs from the green pixels Gb of the first pixel column is input through the pixel signal line 112.

The multiple comparator circuits 132 include the comparator circuits 132 into which the pixel signal PIX based on the outputs from the red pixels R of the third pixel column is input through the pixel signal line 113. The multiple comparator circuits 132 also include the comparator circuits 132 into which the pixel signal PIX based on the outputs from the green pixels Gb of the third pixel column is input through the pixel signal line 114.

The multiple comparator circuits 133 include the comparator circuits 133 into which the pixel signal PIX based on the outputs from the green pixels Gr of the second pixel column is input through the pixel signal line 115. The multiple comparator circuits 133 also include the comparator circuits 133 into which the pixel signal PIX based on the outputs from the blue pixels B of the second pixel column is input through the pixel signal line 116.

The multiple comparator circuits 134 include the comparator circuits 134 into which the pixel signal PIX based on the outputs from the green pixels Gr of the fourth pixel column is input through the pixel signal line 117. The multiple comparator circuits 134 also include the comparator circuits 134 into which the pixel signal PIX based on the outputs from the blue pixels B of the fourth pixel column is input through the pixel signal line 118.

As described above, the green pixels Gb and the red pixels R are read out from the lower signal processing area 21 and the green pixels Gr and the blue pixels B are read out from the upper signal processing area 22. The reset signal CRES1 is supplied to the comparator circuits 131 corresponding to the first pixel column and the fifth pixel column and the reset signal CRES2 is supplied to the comparator circuits 132 corresponding to the third pixel column and the seventh pixel column. The reset signal CRES6 is supplied to the comparator circuits 133 corresponding to the second pixel column and the sixth pixel column and the reset signal CRES7 is supplied to the comparator circuits 134 corresponding to the fourth pixel column and the eighth pixel column. When the driving waveforms illustrated in FIG. 3B are applied to this configuration, the outputs from the comparator circuits 130 corresponding to the first pixel column and the fifth pixel column are inverted at the time t8. The outputs from the comparator circuits 130 corresponding to the other pixel columns are inverted at the time t82. In other words, the outputs from the comparator circuits 130 corresponding to half of all the pixel columns are simultaneously inverted. In contrast, in bright time, the outputs from the red pixels R and the green pixels Gb are differentiated and the outputs from the green pixels Gr and the blue pixels B are differentiated for the light sources of almost all the colors. Accordingly, the number of columns in which the outputs from the comparator circuits 130 are simultaneously inverted is halved (¼ of all the columns). The provision of the columns to which the reset signal CRES1 is applied and the columns to which the reset signal CRES2 is applied in the comparator circuits 130 corresponding to the pixels of the same color enables the number of columns the outputs from which are simultaneously inverted in the AD conversion of the level indicating the amount of signal to be decreased, thereby suppressing the interference between the columns. The same applies to the signal processing area 22.

In the examples illustrated in FIG. 8 and FIG. 9, the two pixel signal lines 110 are provided for one pixel column. Specifically, the pixel signal line 111 with which the pixel area 10 is connected to the signal processing area 21 and the pixel signal line 115 with which the pixel area 10 is connected to the signal processing area 22 are provided for the first pixel column. The pixel signal line 112 with which the pixel area 10 is connected to the signal processing area 21 and the pixel signal line 116 with which the pixel area 10 is connected to the signal processing area 22 are provided for the second pixel column. The pixel signal line 113 with which the pixel area 10 is connected to the signal processing area 21 and the pixel signal line 117 with which the pixel area 10 is connected to the signal processing area 22 are provided for the third pixel column. The pixel signal line 114 with which the pixel area 10 is connected to the signal processing area 21 and the pixel signal line 118 with which the pixel area 10 is connected to the signal processing area 22 are provided for the fourth pixel column.

In the example illustrated in FIG. 8, the multiple comparator circuits 131 include the comparator circuits 131 into which the pixel signal PIX based on the outputs from the red pixels R of the first pixel column is input through the pixel signal line 111. The multiple comparator circuits 131 also include the comparator circuits 131 into which the pixel signal PIX based on the outputs from the green pixels Gr of the second pixel column is input through the pixel signal line 112.

The multiple comparator circuits 132 include the comparator circuits 132 into which the pixel signal PIX based on the outputs from the red pixels R of the third pixel column is input through the pixel signal line 113. The multiple comparator circuits 132 also include the comparator circuits 132 into which the pixel signal PIX based on the outputs from the green pixels Gr of the fourth pixel column is input through the pixel signal line 114.

The multiple comparator circuits 133 include the comparator circuits 133 into which the pixel signal PIX based on the outputs from the green pixels Gb of the first pixel column is input through the pixel signal line 115. The multiple comparator circuits 133 also include the comparator circuits 133 into which the pixel signal PIX based on the outputs from the blue pixels B of the second pixel column is input through the pixel signal line 116.

The multiple comparator circuits 134 include the comparator circuits 134 into which the pixel signal PIX based on the outputs from the green pixels Gb of the third pixel column is input through the pixel signal line 117. The multiple comparator circuits 134 also include the comparator circuits 134 into which the pixel signal PIX based on the outputs from the blue pixels B of the fourth pixel column is input through the pixel signal line 118.

As described above, the red pixels R and the green pixels Gr are read out from the lower signal processing area 21 and the green pixels Gb and the blue pixels B are read out from the upper signal processing area 22. The reset signal CRES1 is supplied to the comparator circuits 131 of the first and second columns and the fifth and sixth columns and the reset signal CRES2 is supplied to the comparator circuits 132 of the third and fourth columns and the seventh and eighth columns. The reset signal CRES6 is supplied to the comparator circuits 133 of the first and second columns and the fifth and sixth columns and the reset signal CRES7 is supplied to the comparator circuits 134 of the third and fourth columns and the seventh and eighth columns. When the driving waveforms illustrated in FIG. 3B are applied to this configuration, the outputs from the comparator circuits 130 of the first, second, fifth, and sixth columns are inverted at the time t8. The outputs from the comparator circuits 130 of the other columns are inverted at the time t82. In other words, the outputs from the comparator circuits 130 of half of all the columns are simultaneously inverted. In contrast, in bright time, the outputs from the red pixels R and the green pixels Gr are differentiated and the outputs from the green pixels Gb and the blue pixels B are differentiated for the light sources of almost all the colors. Accordingly, the number of columns in which the outputs from the comparator circuits 130 are simultaneously inverted is halved (¼ of all the columns). The provision of the columns to which the reset signal CRES1 is applied and the columns to which the reset signal CRES2 is applied in the comparator circuits 130 corresponding to the pixels of the same color enables the number of columns the outputs from which are simultaneously inverted in the AD conversion of the level indicating the amount of signal to be decreased, thereby suppressing the interference between the columns.

A modification of the imaging apparatus IS will now be described with reference to FIG. 9. Only points different from the above examples are described here.

In the example illustrated in FIG. 9, the multiple comparator circuits 131 include the comparator circuits 131 into which the pixel signal PIX based on the outputs from the green pixels Gb of the first pixel column is input through the pixel signal line 111. The multiple comparator circuits 131 also include the comparator circuits 131 into which the pixel signal PIX based on the outputs from the green pixels Gb of the third pixel column is input through the pixel signal line 113. The multiple comparator circuits 132 include the comparator circuits 132 into which the pixel signal PIX based on the outputs from the green pixels Gr of the second pixel column is input through the pixel signal line 112. The multiple comparator circuits 132 also include the comparator circuits 132 into which the pixel signal PIX based on the outputs from the green pixels Gr of the fourth pixel column is input through the pixel signal line 114. The multiple comparator circuits 133 include the comparator circuits 133 into which the pixel signal PIX based on the outputs from the red pixels R of the first pixel column is input through the pixel signal line 115. The multiple comparator circuits 133 also include the comparator circuits 133 into which the pixel signal PIX based on the outputs from the red pixels R of the third pixel column is input through the pixel signal line 117. The multiple comparator circuits 134 include the comparator circuits 134 into which the pixel signal PIX based on the outputs from the blue pixels B of the second pixel column is input through the pixel signal line 116. The multiple comparator circuits 134 also include the comparator circuits 134 into which the pixel signal PIX based on the outputs from the blue pixels B of the fourth pixel column is input through the pixel signal line 118.

As described above, the green pixels Gr and the green pixels Gb are read out from the lower signal processing area 21 and the red pixels R and the blue pixels B are read out from the upper signal processing area 22. The provision of the shield line 300 between the reset signal line 310 and the reset signal line 320 in the signal processing area 21 enables the color mixture between the green pixels Gr and the green pixels Gb to be reduced. The provision of the shield line 350 between the reset signal line 360 and the reset signal line 370 in the signal processing area 22 enables the color mixture between the red pixels R and the blue pixels B to be reduced.

In the examples illustrated in FIG. 7, FIG. 8, and FIG. 9, the area in which the comparator circuits 131 and the comparator circuits 132 are alternately arranged (the signal processing area 21) and the area in which the comparator circuits 133 and the comparator circuits 134 are alternately arranged (the signal processing area 22) are separately provided with the pixel area 10 sandwiched therebetween. Instead of the this configuration, the area in which the comparator circuits 131 and the comparator circuits 132 are alternately arranged (the signal processing area 21) and the area in which the comparator circuits 133 and the comparator circuits 134 are alternately arranged (the signal processing area 22) may be provided at the same side with respect to the pixel area 10. Alternatively, the area in which the comparator circuits 131 and the comparator circuits 132 are alternately arranged (the signal processing area 21) and the area in which the comparator circuits 133 and the comparator circuits 134 are alternately arranged (the signal processing area 22) may be arranged in the signal processing area 20 on the circuit chip 2, illustrated in FIGS. 5D and 5E.

Although the example is described above in which the two kinds of reset signals: the reset signal CRES1 and the reset signal CRES2 are applied to the comparator circuits 130 that are arranged in line, the reset signals of three or more kinds, for example, the reset signals of four kinds may be applied to the comparator circuits 130 that are arranged in line. In such a case, the pairs including the multiple comparator circuits 130 to which the common reset signal is applied and which are adjacent to each other may be alternately arranged, as in the examples illustrated in FIG. 7 and FIG. 8. For example, the multiple comparator circuits 130 may be classified into a first set, a second set, a third set, and a fourth set in the following manner. The first set includes two comparator circuits 130 to which a reset signal of a first kind is applied and which are adjacent to each other and the second set includes two comparator circuits 130 to which a reset signal of a second kind is applied and which are adjacent to each other. The third set includes two comparator circuits 130 to which a reset signal of a third kind is applied and which are adjacent to each other and the fourth set includes two comparator circuits 130 to which a reset signal of a fourth kind is applied and which are adjacent to each other. The first set, the second set, the third set, and the fourth set may be arranged in this order. Groups each including the first set, the second set, the third set, and the fourth set may be arranged in a cyclic manner. One group includes eight comparator circuits 130 to which the reset signals of the four kinds are applied.

Alternatively, the comparator circuits 130 to which different reset signals are applied may be alternately arranged, as in the example illustrated in FIG. 9. In other words, different reset signals may be applied to the comparator circuits 130 that are adjacent to each other.

According to the disclosure, it is possible to improve the accuracy of the comparison in the comparator circuits.

The multiple modifications described above may be appropriately combined. Points that are not specifically described in the above description but are apparent from the drawings compose part of the disclosure. The disclosure is not limited to the above embodiments and may be realized by other configurations that may achieve the spirit and scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-128199 filed Jun. 28, 2016, which is hereby incorporated by reference herein in its entirety.

What is claimed is:
1. An imaging apparatus comprising:
a plurality of pixels; and
a plurality of comparator circuits each outputting a comparison signal,
wherein a pixel signal based on outputs from the pixels and a reference signal are input into each of the plurality of comparator circuits, a level of the comparison signal when a difference between the pixel signal and the reference signal is smaller than a threshold value is different from a level of the comparison signal when the difference between the pixel signal and the reference signal is greater than the threshold value, and
wherein a plurality of first comparator circuits, among the plurality of comparator circuits, and a plurality of second comparator circuits, among the plurality of comparator circuits, are arranged in line, the imaging apparatus further comprising:
a first reset signal line which is commonly connected to the plurality of first comparator circuits and through which a first reset signal to reset a threshold value of each of the plurality of first comparator circuits is transmitted;
a second reset signal line which is commonly connected to the plurality of second comparator circuits and through which a second reset signal to reset a threshold value of each of the plurality of second comparator circuits is transmitted; and
a shield line,
wherein a distance between the first reset signal line and the shield line and a distance between the second reset signal line and the shield line are smaller than a distance between the first reset signal line and the second reset signal line.

2. The imaging apparatus according to claim 1,
wherein each of the plurality of comparator circuits includes a comparator and a first transistor,
wherein one of a source and a drain of the first transistor is connected to an input terminal corresponding to the pixel signal of the comparator and the other of the source and the drain of the first transistor is connected to an output terminal through which the comparison signal of the comparator is output,
wherein a gate of the first transistor of each of the plurality of first comparator circuits is connected to the first reset signal line, and
wherein a gate of the first transistor of each of the plurality of second comparator circuits is connected to the second reset signal line.

3. The imaging apparatus according to claim 2,
wherein each of the plurality of comparator circuits further includes a second transistor,
wherein one of a source and a drain of the second transistor is connected to an input terminal corresponding to the reference signal of the comparator and the other of the source and the drain of the second transistor is connected to an output terminal through which an inversion signal of the comparison signal of the comparator is output,
wherein a gate of the second transistor of each of the plurality of first comparator circuits is connected to the first reset signal line, and
wherein a gate of the second transistor of each of the plurality of second comparator circuits is connected to the second reset signal line.

4. The imaging apparatus according to claim 3,
wherein each of the plurality of comparator circuits includes a capacitance with which a pixel signal line through which the pixel signal is transmitted is connected to the input terminal corresponding to the pixel signal and a capacitance with which a reference signal line through which the reference signal is transmitted is connected to the input terminal corresponding to the reference signal.

5. The imaging apparatus according to claim 1,
wherein the reference signal, the first reset signal, and the second reset signal are set so that the threshold value of each of the plurality of first comparator circuits is different from the threshold value of each of the plurality of second comparator circuits.

6. The imaging apparatus according to claim 1, further comprising:
a first inversion signal line which is commonly connected to the plurality of first comparator circuits and through which an inversion signal of the first reset signal is transmitted,
wherein a distance between the first reset signal line and the first inversion signal line is smaller than the distance between the first reset signal line and the second reset signal line.

7. The imaging apparatus according to claim 6,
wherein the distance between the first reset signal line and the first inversion signal line is smaller than the distance between the first reset signal line and the shield line.

8. The imaging apparatus according to claim 2,
wherein each of the plurality of comparator circuits includes a switch used to control conduction and non-conduction between the input terminal through which the pixel signal of the comparator is input and the output terminal through which the comparison signal of the comparator is output in accordance with an inversion signal of the first reset signal.

9. An imaging apparatus comprising:
a plurality of pixels; and
a plurality of comparator circuits each outputting a comparison signal,
wherein a pixel signal based on outputs from the pixels and a reference signal are input into each of the plurality of comparator circuits, and
wherein a plurality of first comparator circuits, among the plurality of comparator circuits, and a plurality of second comparator circuits, among the plurality of comparator circuits, are arranged in line, the imaging apparatus further comprising:
a first signal line commonly connected to the plurality of first comparator circuits;
a second signal line commonly connected to the plurality of second comparator circuits; and
a fixed electric potential line through which fixed electric potential is supplied,
wherein each of the plurality of comparator circuits includes a comparator, a first transistor, and a second transistor,
wherein one of a source and a drain of the first transistor is connected to an input terminal corresponding to the pixel signal of the comparator and the other of the source and the drain of the first transistor is connected to an output terminal through which the comparison signal of the comparator is output,
wherein a gate of the first transistor of each of the plurality of first comparator circuits is connected to the first signal line,
wherein a gate of the first transistor of each of the plurality of second comparator circuits is connected to the second signal line,
wherein one of a source and a drain of the second transistor is connected to an input terminal corresponding to the reference signal of the comparator and the other of the source and the drain of the second transistor is connected to an output terminal through which an inversion signal of the comparison signal of the comparator is output,
wherein a gate of the second transistor of each of the plurality of first comparator circuits is connected to the first signal line,
wherein a gate of the second transistor of each of the plurality of second comparator circuits is connected to the second signal line, and
wherein a distance between the first signal line and the fixed electric potential line and a distance between the second signal line and the fixed electric potential line are smaller than a distance between the first signal line and the second signal line.

10. The imaging apparatus according to claim 9,
wherein potential is supplied to the fixed electric potential line from a pad that supplies power supply potential to the plurality of first comparator circuits and the plurality of second comparator circuits.

11. The imaging apparatus according to claim 9,
wherein each of the first signal line, the second signal line, and the fixed electric potential line is composed of at least a first wiring layer and a second wiring layer, which are connected to each other, wherein a width of a line composing the first signal line in the second wiring layer is smaller than a width of a line composing the first signal line in the first wiring layer, wherein a width of a line composing the second signal line in the second wiring layer is smaller than a width of a line composing the second signal line in the first wiring layer, and wherein a width of a line composing the fixed electric potential line in the second wiring layer is greater than a width of a line composing the fixed electric potential line in the first wiring layer.

12. The imaging apparatus according to claim 9, wherein a pixel area in which the plurality of pixels are arranged has a first column in which red pixels that detect red light and green pixels that detect green light are arranged, a second column in which blue pixels that detect blue light and green pixels that detect green light are arranged, a third column in which red pixels that detect red light and green pixels that detect green light are arranged, and a fourth column in which blue pixels that detect blue light and green pixels that detect green light are arranged, wherein the plurality of first comparator circuits include the first comparator circuit into which the pixel signal based on outputs from the red pixels of the first column is input and the first comparator circuit into which the pixel signal based on outputs from the green pixels of the first column is input, and wherein the plurality of second comparator circuits include the second comparator circuit into which the pixel signal based on outputs from the red pixels of the third column is input and the second comparator circuit into which the pixel signal based on outputs from the green pixels of the third column is input.

13. The imaging apparatus according to claim 12, wherein a plurality of third comparator circuits, among the plurality of comparator circuits, and a plurality of fourth comparator circuits, among the plurality of comparator circuits, are arranged in line, the imaging apparatus further comprising:

a third signal line which is commonly connected to the plurality of third comparator circuits and through which a third signal to reset a threshold value of each of the plurality of third comparator circuits is transmitted; and a fourth signal line which is commonly connected to the plurality of fourth comparator circuits and through which a fourth signal to reset a threshold value of each of the plurality of fourth comparator circuits is transmitted, wherein the plurality of third comparator circuits include the third comparator circuit into which the pixel signal based on outputs from the green pixels of the second column is input and the third comparator circuit into which the pixel signal based on outputs from the blue pixels of the second column is input, and wherein the plurality of fourth comparator circuits include the fourth comparator circuit into which the pixel signal based on outputs from the green pixels of the fourth column is input and the fourth comparator circuit into which the pixel signal based on outputs from the blue pixels of the fourth column is input.

14. The imaging apparatus according to claim 9, wherein a pixel area in which the plurality of pixels are arranged has a first column in which red pixels that detect red light and green pixels that detect green light are arranged, a second column in which blue pixels that detect blue light and green pixels that detect green light are arranged, a third column in which red pixels that detect red light and green pixels that detect green light are arranged, and a fourth column in which blue pixels that detect blue light and green pixels that detect green light are arranged, wherein the plurality of first comparator circuits include the first comparator circuit into which the pixel signal based on outputs from the red pixels of the first column is input and the first comparator circuit into which the pixel signal based on outputs from the green pixels of the second column is input, and wherein the plurality of second comparator circuits include the second comparator circuit into which the pixel signal based on outputs from the red pixels of the third column is input and the second comparator circuit into which the pixel signal based on outputs from the green pixels of the fourth column is input.

15. The imaging apparatus according to claim 14, wherein a plurality of third comparator circuits, among the plurality of comparator circuits, and a plurality of fourth comparator circuits, among the plurality of comparator circuits, are arranged in line, the imaging apparatus further comprising:

a third signal line which is commonly connected to the plurality of third comparator circuits and through which a third signal to reset a threshold value of each of the plurality of third comparator circuits is transmitted; and a fourth signal line which is commonly connected to the plurality of fourth comparator circuits and through which a fourth signal to reset a threshold value of each of the plurality of fourth comparator circuits is transmitted, wherein the plurality of third comparator circuits include the third comparator circuit into which the pixel signal based on outputs from the green pixels of the first column is input and the third comparator circuit into which the pixel signal based on outputs from the blue pixels of the second column is input, and wherein the plurality of fourth comparator circuits include the fourth comparator circuit into which the pixel signal based on outputs from the green pixels of the third column is input and the fourth comparator circuit into which the pixel signal based on outputs from the blue pixels of the fourth column is input.

16. The imaging apparatus according to claim 9, wherein a pixel area in which the plurality of pixels are arranged has a first column in which red pixels that detect red light and green pixels that detect green light are arranged, a second column in which blue pixels that detect blue light and green pixels that detect green light are arranged, a third column in which red pixels that detect red light and green pixels that detect green light are arranged, and a fourth column in which blue pixels that detect blue light and green pixels that detect green light are arranged, wherein the plurality of first comparator circuits include the first comparator circuit into which the pixel signal based on outputs from the green pixels of the first column is input and the first comparator circuit into which the pixel signal based on outputs from the green pixels of the third column is input, and wherein the plurality of second comparator circuits include the second comparator circuit into which the pixel signal based on outputs from the green pixels of the second column is input and the second comparator circuit into which the pixel signal based on outputs from the green pixels of the fourth column is input.

17. The imaging apparatus according to claim 16,
wherein a plurality of third comparator circuits, among the plurality of comparator circuits, and a plurality of fourth comparator circuits, among the plurality of comparator circuits, are arranged in line, the imaging apparatus further comprising:
a third signal line which is commonly connected to the plurality of third comparator circuits and through which a third signal to reset a threshold value of each of the plurality of third comparator circuits is transmitted; and
a fourth signal line which is commonly connected to the plurality of fourth comparator circuits and through which a fourth signal to reset a threshold value of each of the plurality of fourth comparator circuits is transmitted,
wherein the plurality of third comparator circuits include the third comparator circuit into which the pixel signal based on outputs from the red pixels of the first column is input and the third comparator circuit into which the pixel signal based on outputs from the red pixels of the third column is input, and
wherein the plurality of fourth comparator circuits include the fourth comparator circuit into which the pixel signal based on outputs from the blue pixels of the second column is input and the fourth comparator circuit into which the pixel signal based on outputs from the blue pixels of the fourth column is input.

18. The imaging apparatus according to claim 12, further comprising:
a second fixed electric potential line to which fixed electric potential is supplied,
wherein a distance between the third signal line and the second fixed electric potential line and a distance between the fourth signal line and the second fixed electric potential line are smaller than a distance between the third signal line and the fourth signal line.

19. The imaging apparatus according to claim 13,
wherein the pixel area is provided between a first area in which the plurality of first comparator circuits and the plurality of second comparator circuit are arranged and a second area in which the plurality of third comparator circuits and the plurality of fourth comparator circuits are arranged.

20. The imaging apparatus according to claim 9, further comprising:
a plurality of capacitances that is provided between the plurality of pixels, and the plurality of first comparator circuit and the plurality of second comparator circuits, that corresponds to the plurality of respective first comparator circuits and the plurality of respective second comparator circuits, and that hold outputs from the pixels; and
a ground line that is provided between the plurality of pixels, and the plurality of first comparator circuit and the plurality of second comparator circuits and that is commonly connected to one node of each of the plurality of capacitances,
wherein ground potential is supplied to the ground line from a pad different from the pad that supplies the ground potential to the pixels.

21. The imaging apparatus according to claim 1,
wherein each of the plurality of comparator circuits composes an analog-to-digital converter with a first memory and a second memory, the imaging apparatus further comprising:
a first digital signal line through which a digital value held in the first memory is transmitted;
a second digital signal line through which a digital value held in the second memory is transmitted; and
a signal processor to which the first digital signal line and the second digital signal line are connected and which generates a signal indicating a difference between the digital value transmitted through the first digital signal line and the digital value transmitted through the second digital signal line.

22. An imaging system including the imaging apparatus according to claim 1, the imaging system comprising at least one of:
an optical system that forms an image on the imaging apparatus;
a control unit that controls the imaging apparatus;
a processing unit that processes a signal output from the imaging apparatus;
a display unit that displays an image captured by the imaging apparatus; and
a storage unit that stores an image captured by the imaging apparatus.

23. An imaging system including the imaging apparatus according to claim 9, the imaging system comprising at least one of:
an optical system that forms an image on the imaging apparatus;
a control unit that controls the imaging apparatus;
a processing unit that processes a signal output from the imaging apparatus;
a display unit that displays an image captured by the imaging apparatus; and
a storage unit that stores an image captured by the imaging apparatus.

24. The imaging apparatus according to claim 1, further comprising:
a first semiconductor chip where the plurality of pixels are provided; and
a second semiconductor chip where the plurality of comparator circuits are provided,
wherein the first semiconductor chip and the second semiconductor chip are stacked.

25. The imaging apparatus according to claim 9, further comprising:
a first semiconductor chip where the plurality of pixels are provided; and
a second semiconductor chip where the plurality of comparator circuits are provided,
wherein the first semiconductor chip and the second semiconductor chip are stacked.

* * * * *